United States Patent [19]

White

[11] Patent Number: 5,247,515

[45] Date of Patent: Sep. 21, 1993

[54] APPARATUS FOR EXTRACTING ONE FROM MANY MULTIPLEXED SIGNALS

[75] Inventor: Stanley A. White, San Clemente, Calif.

[73] Assignee: Rockwell International Corporation, Seal Beach, Calif.

[21] Appl. No.: 646,912

[22] Filed: Jan. 28, 1991

[51] Int. Cl.$^5$ .............................................. H04J 1/02
[52] U.S. Cl. ..................................... 370/70; 370/69.1
[58] Field of Search .................. 370/50, 69.1, 123, 70; 375/1

[56] References Cited

U.S. PATENT DOCUMENTS

| | | | |
|---|---|---|---|
| 3,806,655 | 4/1974 | Hekimian et al. | 370/69.1 |
| 4,412,325 | 10/1983 | Molo | 370/50 |
| 4,792,943 | 12/1988 | Göckler | 370/70 |
| 4,881,222 | 11/1989 | Goeckler et al. | 370/70 |

Primary Examiner—Douglas W. Olms
Assistant Examiner—Alpus H. Hsu
Attorney, Agent, or Firm—H. Frederick Hamann; George A. Montanye; Wilfred G. Caldwell

[57] ABSTRACT

The present invention provides a highly efficient, high speed, and low power method and apparatus for extraction of a single signal from a set of frequency division multiplexed (FDM) signals. The apparatus operates on an analytical digital FDM-type group of signals to decompose the overall signal spectrum by octaves until a single signal or channel is selected. The signal selection is accomplished by transferring received FDM signals into a bandsplitting filter where the spectrum is divided into an upper and lower half-band spectrum. The upper half-band is complex shifted into the lower half-band and one half-band eliminated from further consideration. The selected half-band is decimated by a factor of two and recirculated through the filter where it is repetitively half-band filtered, complex shifted, and decimated until a desired single channel remains. The signal data from one processing pass is interleaved with data from previous passes to increase processing efficiency and speed.

31 Claims, 13 Drawing Sheets

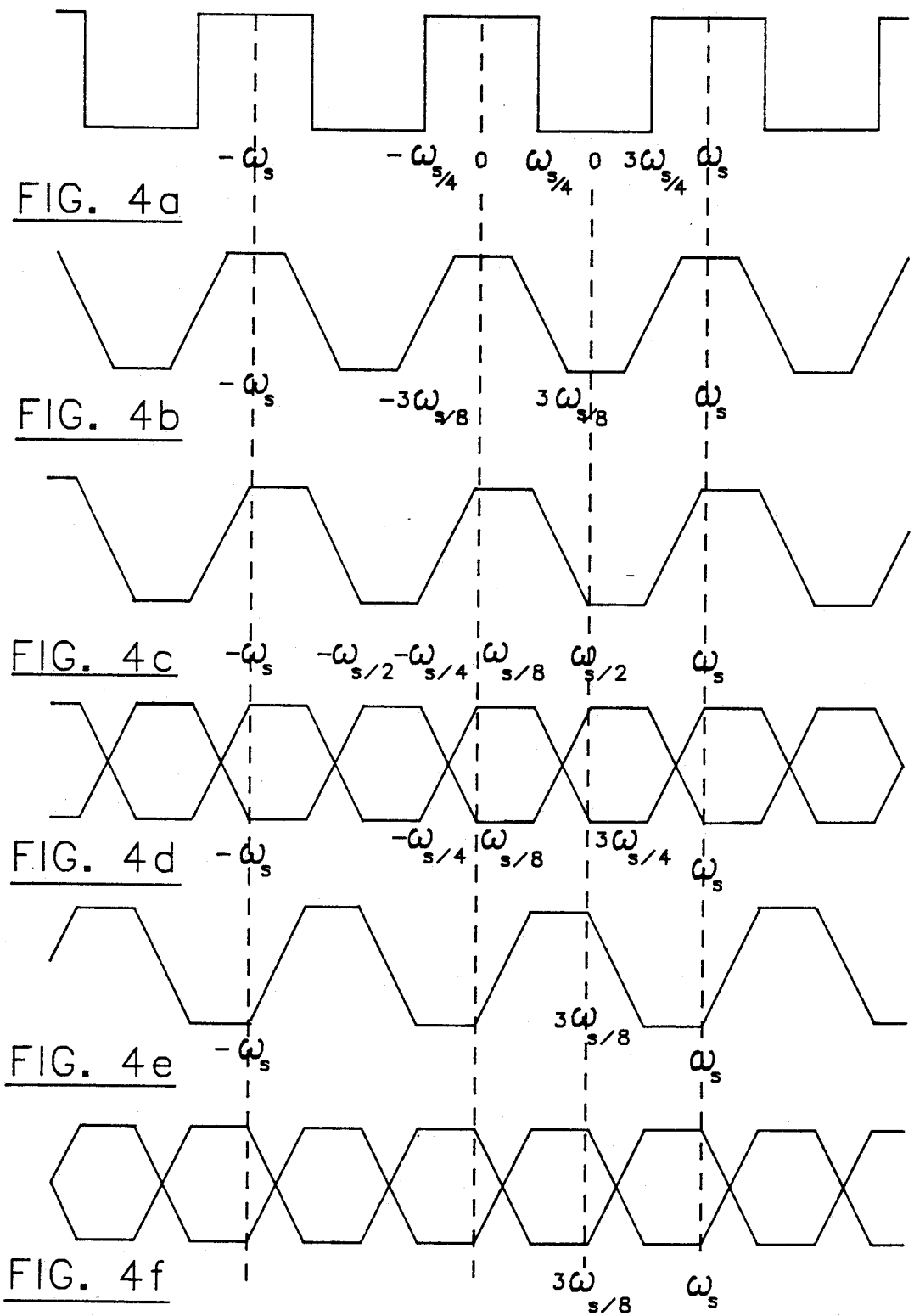

FIG. 9

| CLOCK PERIOD | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| LINE 1 k=  | 0 | 1 | 2 | 3 | 4 | 5 | 6 | 7 | 8 | 9 | 10 | 11 | 12 | 13 | 14 | 15 | x | x | x | x | x | x | x | x | x | x | x | x | x | x | x | x |
| P=1 | 1 | 1 | 2 | 3 | 4 | 5 | 6 | 7 | 8 | 9 | 10 | 11 | 12 | 13 | 14 | 15 | x | x | x | x | x | x | x | x | x | x | x | x | x | x | x | x |
| P | 1 | 1 | 1 | 1 | 1 | 1 | 1 | 1 | 1 | 1 | 1 | 1 | 1 | 1 | 1 | 1 | x | x | x | x | x | x | x | x | x | x | x | x | x | x | x | x |
| P_max=1 |  |  |  |  |  |  |  |  |  |  |  |  |  |  |  |  |  |  |  |  |  |  |  |  |  |  |  |  |  |  |  |  |
| LINE 2 k= | 0 | 1 | 2 | 3 | 4 | 5 | 6 | 7 | 8 | 9 | 10 | 11 | 12 | 13 | 14 | 15 | x | x | x | x | x | x | x | x | x | x | x | x | x | x | x | x |
| P=1 | 1 | 2 | 3 | 4 | 5 | 6 | 7 | 8 | 9 | 10 | 11 | 12 | 13 | 14 | 15 | x | x | x | x | x | x | x | x | x | x | x | x | x | x | x | x | x |
| P | 1 | 1 | 1 | 1 | 2 | 2 | 2 | 2 | 1 | 1 | 1 | 1 | 2 | 2 | 2 | 2 | x | x | x | x | x | x | x | x | x | x | x | x | x | x | x | x |
| P_max=2 |  |  |  |  |  |  |  |  |  |  |  |  |  |  |  |  |  |  |  |  |  |  |  |  |  |  |  |  |  |  |  |  |
| LINE 3 k= | 0 | 1 | 2 | 3 | 0 | 1 | 2 | 3 | 4 | 5 | 6 | 7 | 8 | 9 | 10 | 11 | 12 | 13 | 14 | 15 | x | x | x | x | x | x | x | x | x | x | x | x |
| P=1 | 1 | 2 | 3 | 4 | 5 | 6 | 7 | 8 | 9 | 10 | 11 | 12 | 13 | 14 | 15 | x | x | x | x | x | x | x | x | x | x | x | x | x | x | x | x | x |
| P | 1 | 3 | 1 | 3 | 1 | 3 | 1 | 3 | 1 | 3 | 1 | 3 | 1 | 3 | 1 | 3 | x | x | x | x | x | x | x | x | x | x | x | x | x | x | x | x |
| P_max=3 |  |  |  |  |  |  |  |  |  |  |  |  |  |  |  |  |  |  |  |  |  |  |  |  |  |  |  |  |  |  |  |  |
| LINE 4 k= | 0 | 1 | 2 | 3 | 0 | 1 | 2 | 3 | 4 | 5 | 6 | 7 | 8 | 9 | 10 | 11 | 12 | 13 | 14 | 15 | 1 | x | x | x | x | x | x | x | x | x | x | x |
| P=1 | 1 | 2 | 3 | 4 | 5 | 6 | 7 | 8 | 9 | 10 | 11 | 12 | 13 | 14 | 15 | 1 | x | x | x | x | x | x | x | x | x | x | x | x | x | x | x | x |
| P | 1 | 2 | 1 | 4 | 1 | 2 | 1 | 2 | 1 | 2 | 1 | 4 | 1 | 2 | 1 | 2 | 1 | x | x | x | x | x | x | x | x | x | x | x | x | x | x | x |
| P_max=4 |  |  |  |  |  |  |  |  |  |  |  |  |  |  |  |  |  |  |  |  |  |  |  |  |  |  |  |  |  |  |  |  |
| LINE 5 k= | 0 | 1 | 2 | 3 | 0 | 1 | 2 | 3 | 4 | 5 | 6 | 7 | 8 | 9 | 10 | 11 | 12 | 13 | 14 | 15 | 0 | x | x | x | x | x | x | x | x | x | x | x |
| P=1 | 1 | 2 | 3 | 4 | 5 | 6 | 7 | 8 | 9 | 10 | 11 | 12 | 13 | 14 | 15 | 0 | x | x | x | x | x | x | x | x | x | x | x | x | x | x | x | x |
| P | 1 | 2 | 1 | 4 | 1 | 2 | 1 | 5 | 1 | 2 | 1 | 4 | 1 | 2 | 1 | 3 | 1 | x | x | x | x | x | x | x | x | x | x | x | x | x | x | x |
| P_max=5 |  |  |  |  |  |  |  |  |  |  |  |  |  |  |  |  |  |  |  |  |  |  |  |  |  |  |  |  |  |  |  |  |
| LINE 6 k= | 0 | 1 | 2 | 3 | 0 | 1 | 2 | 3 | 4 | 5 | 6 | 7 | 8 | 9 | 10 | 11 | 12 | 13 | 14 | 15 | 0 | 6 |  |  |  |  |  |  |  |  |  |  |
| P=1 | 1 | 2 | 3 | 4 | 5 | 6 | 7 | 8 | 9 | 10 | 11 | 12 | 13 | 14 | 15 | 0 | 6 |  |  |  |  |  |  |  |  |  |  |  |  |  |  |  |
| P | 1 | 2 | 1 | 4 | 1 | 2 | 1 | 5 | 1 | 2 | 1 | 4 | 1 | 2 | 1 | 3 | 1 | 2 |  |  |  |  |  |  |  |  |  |  |  |  |  |  |
| P_max=6 |  |  |  |  |  |  |  |  |  |  |  |  |  |  |  |  |  |  |  |  |  |  |  |  |  |  |  |  |  |  |  |  |

APPARATUS FOR EXTRACTING ONE FROM MANY MULTIPLEXED SIGNALS

BACKGROUND OF THE INVENTION

1. Field of the Invention

The present invention relates to signal demodulation and decoding and more particularly to the extraction of a single signal or channel from a set of frequency division multiplexed signals or channels. The invention further relates to a high speed half-band filter having a dynamically resettable center frequency for extracting a single preselected frequency band from a broader band input signal.

2. Related Technical Art

There are many operational situations in the communications and signal processing arts in which it is desirable to separate, extract, or monitor a small sample or single channel of a large number of Frequency Division Multiplexed (FDM) signals. Such signals are typically used in satellite or other advanced communication systems, such as fiber-optics or waveguide-based communication systems. This multiplexing allows many signals to be combined into a single wideband channel to make maximum use of channel capacity, high transfer rates, common central processing, etc.

The task of separating particular communication signals from a FDM packet or group of signals is a complex and difficult task, especially at the high speeds typically involved. It is necessary to adequately isolate the single channel and extract it from adjacent channels before any decoding, verification, or other processing can occur. There is a variety of full FDM/TDM demultiplexers available which are designed to perform the extraction task.

Current demultiplexers achieve adequate extraction results but with a great deal of complexity, expense, and power consumption. These demultiplexers are also typically designed to achieve high accuracy tracking and information decoding. Currently such demultiplexers employ a finite-impulse-response (FIR) filter (or fast convolution equivalent) as the only type of filter that performs phase distortionless linear signal filtering. However, to achieve a high level of signal resolution or accuracy, a very high order filter (either one very long filter or many small filters) is required which also increases the complexity and cost, while decreasing throughput speed. Unfortunately, for many advanced applications, especially where equipment is to be mobile or otherwise power limited, complexity and speed become critical design issues.

What is needed is an apparatus or method of operation that can reduce the complexity and power requirements for high speed FDM signal extraction. In addition, it would be advantageous if the apparatus is capable of good channel separation. A signal demultiplexer embodying these improvements would have increased applicability over current designs for many situations.

SUMMARY

In view of the limitations and problems in the art, it is a purpose of the present invention to provide a new apparatus for extracting one of many FDM signals using repetitive half-band filtering.

An advantage of the present invention is that it is simpler than current designs and requires less power.

Another advantage of the present invention is that it provides an output with no phase distortion.

These and other purposes, objects, and advantages of the invention are realized in a signal extraction method and apparatus in which a signal input device receives FDM signals which fall within a predetermined frequency spectrum or range and digital analytical format, splits the signals into upper and lower half-band components, selects a desired half-band for further processing, and recirculates the selected output until a single channel remains. The FDM signals are input through a receiver which typically converts analog signals into the desired digital analytical format. A bandsplitting filter is connected to the receiver and generates the upper and lower frequency half-bands from input signal data. A frequency down-shifter is connected in series with the upper half-band output to shift these signals into the lower frequency half-band. A band selector, such as an electronic switching element is connected in series with both half-band outputs and selects one output signal for further processing.

The recirculation operation is preferably accomplished by transferring selected output data into a memory element or buffer, and then using timing and control elements to clock the data into the bandsplitting filter in timed relationship to other input signal data. The recirculated data is also decimated by a factor of two during each transfer cycle, typically by transferring only every other data sample within the selected half-band signal. This decimation allows the transfer rate to occur at one-half of the immediately preceding data sample rate. Therefore, recirculated data from each transfer cycle can be interleaved with data from previous selection steps and allow advantageous use of processing capacity which also increases overall data throughput or processing speed.

In order to extract a single channel from a group of C channels, the data recirculation for bandsplitting is achieved $\log_2 C$. rounded to the nearest higher integer value, times. A multiplexing element such as a multipole switching element may be used to effect the timing and data decimation at either the bandsplitting output or input.

The bandsplitting filter comprises a unique tapped line-type filter having $N+1$ filter taps, where N is determined by a desired noise isolation level and is typically on the order of 6 or less. The value of N is dependent upon the sampling frequency times a desired noise isolation factor, in dB, and a desired transition bandwidth.

In a preferred embodiment, the input data for the bandsplitting filter is separated into real data samples and imaginary data samples with each being directed to separate filter sections or portions for filtering. The real and imaginary data samples each have a weighting factor $g_o$ applied, generally by preconfigured multipliers, and are then delayed in a delay element for a preselected time delay of N unit-time periods. At the same time, the real and imaginary data samples are transferred to a plurality of k weighting elements, such as multipliers, where predetermined weighting coefficients $g_k$ are applied, with k being an integer greater than zero and less than or equal to N. In the generally preferred embodiments, the weighting coefficients $g_k$ are equal to zero for k equal to an even number and, therefore, weighting elements associated with these factors are typically eliminated.

The $g_k$ weighted data samples are each transferred to one of a plurality of k second and third delay elements in parallel where they are delayed by factors of N−k and N+k unit-time periods, respectively. The $k^{th}$ second and third delayed weighted data samples are then added in a first summation element to form a plurality of k weighted sums. A sign allocation element provides a sign factor adjustment to each of the k weighted sums which is equal to minus one raised to the power of the absolute value of k divided by four and rounded to the nearest lower integer value. The sign adjusted weighted sums are the all added together in a second summation element to form a first composite signal.

At the same time, the difference of each $k^{th}$ second and third delayed weighted data samples are generated in a third summation element to form k weighted differences which are each sign adjusted in a second sign allocation element by a factor equal to minus one raised to the power of the absolute value of k divided by four plus two and rounded to the nearest lower integer value. All of the adjusted weighted differences are added together in a fourth summation element to form a second composite signal. This results in first and second composite real, first and second composite imaginary, and real and imaginary delayed $g_o$ weighted signals.

The second composite imaginary signal is subtracted from the sum of the first composite and delayed $g_o$ weighted real signals in a fifth summation element, to provide a real lower half-band signal $Y_{RL}$. The first composite and delayed $g_o$ weighted imaginary signals are added to the second composite real signal in a sixth summation element, to provide an imaginary lower half-band signal $Y_{IL}$. The first composite real and second composite imaginary signals are subtracted from the delayed $g_o$ weighted real signal in a seventh summation element to provide a real upper or high half-band signal $Y_{RH}$. The first composite imaginary signal is subtracted from the sum of the second composite real and delayed $g_o$ weighted imaginary signals in an eighth summation element, to provide an imaginary high half-band signal $Y_{IH}$.

The $Y_{RH}$ and $Y_{IH}$ signals are multiplied by a factor of $e^{-jk\pi/2}$ to achieve the complex shifting of the high half-band into the lower half-band frequency spectrum. The $Y_{RL}$, $Y_{IL}$, $Y_{RH}$, and $Y_{IH}$ signals are then decimated by a factor of two and transferred at one-half of the immediately preceding data sample rate back into the front of the bandsplitting filter. The decimation is easily achieved by using one or more electronic switching elements to transfer all odd numbered data samples to the $g_o$ weighting coefficient elements and all even numbered data samples to the $g_k$ (where $k \neq 0$) weighting coefficient elements which are typically simple preconfigured multipliers. The selected decimated $Y_{RL}$, $Y_{IL}$, $Y_{RH}$, and $Y_{IH}$ signals are transferred into the memory device and then clocked into the bandsplitting filter.

Alternatively, the bandsplitting comprises implementing a second delay of N−k unit-time periods in the second delay elements and a third delay of 2k unit-time periods in the third delay element which is placed in series with the second delay element. The $k^{th}$ second and third delayed weighted data samples are then added together as before to form a plurality of k weighted sums and then sign adjusted before being added to form the first composite signal.

In further embodiments, the input is configured to provide separate sequences of real and imaginary data input samples, typically on separate input data buses. The first weighting coefficient, $g_o$, is unity, so no multiplier is needed unless a delay or gain compensation element is desired. First and second delay elements operate on the imaginary and real data to impose a d unit-time delay and an additional 6 unit-time delay to achieve the desired N unit time delay.

The real and imaginary data samples are weighted by the three coefficients $g_1$, $g_2$, and $g_3$, using first, second, and third multipliers working in parallel. Third, fourth, and sixth delay elements are connected in series with the first, second, and third multipliers, respectively. A fifth delay element is connected in series with the fourth delay element and a seventh with the sixth. The third through seventh delay elements implement delays of 10, 2, 6, 4, and 2, respectively.

The output of the first multiplier, and the fifth and sixth delay elements, are connected to a first adder for generating a summation of their respective outputs which is the first composite real signal. The output of the third, fourth, and seventh delay elements are connected to a second adder for generating a summation thereof, which is the second composite real signal. For the imaginary portion of the half-band filter third and fourth adders receive associated delay element and multiplier outputs so as to generate the corresponding first and second composite imaginary signals.

A fifth adder is connected to the first and second real adders, and the second imaginary data delay element and generates a third composite real signal by adding the second real composite signal to the second delayed imaginary signal, and subtracting the second real composite signal. A sixth adder is connected to the first and second imaginary adders and the second real delay element, and adds the second imaginary composite and second real delayed signals and subtracts the first imaginary composite signal to form a third imaginary composite signal.

A seventh adder provides a lower half-band real signal $Y_{RL}$ by adding the first, second, and sixth adder outputs, or first composite real, second composite real and third composite imaginary signals. An eighth adder provides an upper half-band real signal $Y_{RH}$ by subtracting the output of the first and second adders from the sixth adder output. A ninth adder provides a lower half-band imaginary signal $Y_{IL}$ by adding the outputs of the third, fourth, and fifth adders. A tenth adder provides an upper half-band imaginary signal $Y_{IH}$ by subtracting the outputs of the third and fourth adders from the output of the fifth adder. A pair of multipliers connected to the eighth and tenth adders multiply the $Y_{RH}$ and $Y_{IH}$ signals by a factor of $e^{-jk\pi/2}$.

Gain shifting elements are typically connected in series with the outputs from the seventh, eighth, ninth and tenth summers to maximize the dynamic range of the signal output. As stated before, selection elements in the form of electronic switches are connected in series with the imaginary and real data outputs to select an upper or lower half-band portion of the output signals.

A recirculation data bus is connected between the selection switches and the filter input for transferring output data to the input for recirculation. A memory or storage device is connected in series with the recirculation data bus for temporarily storing recirculating data. This memory typically comprises a RAM circuit operating under a preselected addressing, input/output, and recirculation control program. The timing and number of recirculations to generate a desired output signal can be dynamically adjusted using an external control element. In this embodiment, the input comprises an input multiplexing switch, typically in the form of a multipole electronic switch element, that directs all even numbered data samples (initial or recirculated) to the multipliers and all odd numbered samples to the first delay elements.

Using this method and apparatus a very high speed, low power, low complexity, distortionless frequency selector can be manufactured. The resulting circuitry can also be reduced to a single monolithic product using current technology.

BRIEF DESCRIPTION OF THE DRAWINGS

The novel features of the present invention may be better understood from the accompanying description when taken in conjunction with the accompanying drawings in which:

FIG. 3b illustrates an implementation of a complex data filter employing four ideal linear FIR filters of FIG. 3a;

FIG. 4 illustrates frequency response curves useful in describing the behavior of bandsplitting filters;

FIG. 9 illustrates an exemplary correlation between data passes and multiplexing of data through the bandsplitting filter apparatus of FIG. 8;

DETAILED DESCRIPTION OF PREFERRED EMBODIMENTS

The present invention provides a highly efficient and high speed, low power, technique for extraction of a single channel or signal from a set of frequency division multiplexed (FDM) signals. The inventive device operates on a Hilbert transformed digital FDM-type group of signals to decompose the overall signal spectrum by octaves until a single channel or signal is selected.

The invention accomplishes channel selection by applying a half-band filtering and complex shifting operation to received FDM signals, and then eliminating either an upper or lower one-half signal spectrum from further consideration. The selected signal spectrum portion is repetitively half-band filtered, shifted, and decimated until a desired single channel remains. The signal data from one processing pass is interleaved with data from previous passes to increase processing speed. In order to isolate a single channel from a bank or group of "C" channels, $\log_2 C$ passes are required. The invention can generally be provided as a single integrated circuit chip, and represents a powerful filter.

The present invention is designed to operate on signals provided on a digitized complex signal data bus and to present one-of-many signals available for subsequent monitoring or processing. Therefore, the present invention accepts digital data signals which have been received as analog transmissions and preprocessed for conversion into a complex digital format.

Figure 1:
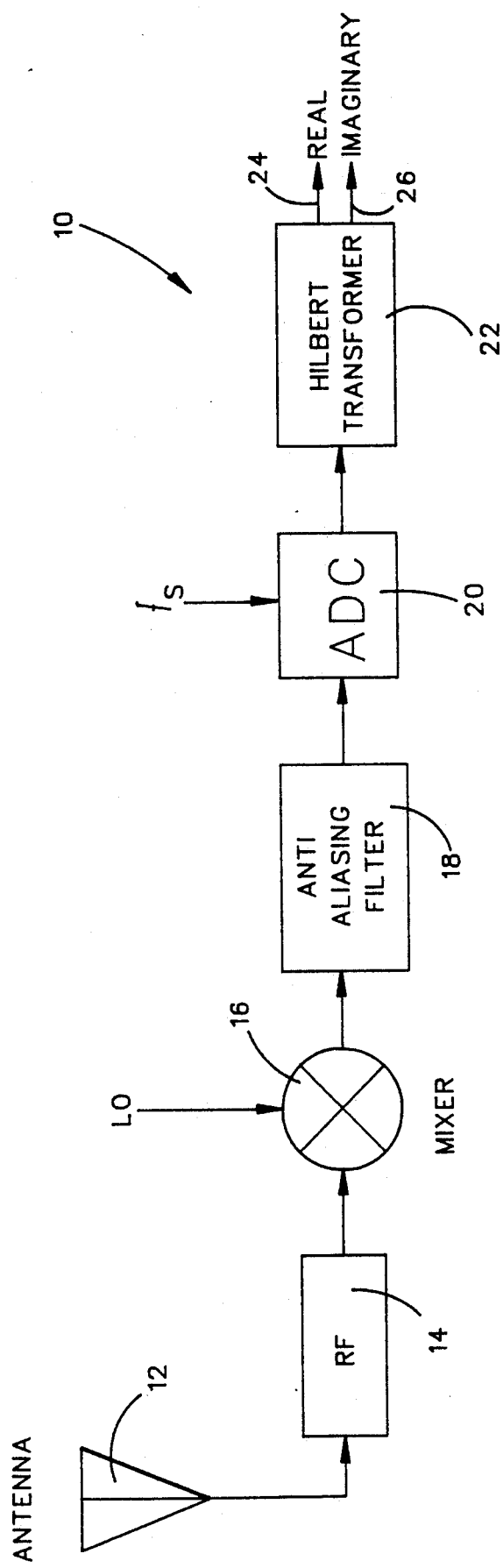
FIG. 1 illustrates a general overview of a multi-channel or multiplexed signal receiver typically applied as an input to the present invention.

A typical receiver used to receive and convert an analog FDM-type signal into a digital analytical signal is illustrated in FIG. 1. In FIG. 1, a receiver 10 uses a variety of antennas, or an array, 12 to detect desired FDM-type signals in one or more predetermined radio frequency (RF) ranges and transfer them to an RF frequency tuning and reception stage 14. The RF stage 14 may employ various known reception, tuning, filtering, amplification, or decoding circuits, depending upon the application. From the RF reception stage 14, the detected analog-type signal is transferred to a signal mixer 16 where it is mixed with a local oscillator (LO) signal to shift the frequency to a new intermediate frequency range (generally lower than RF) for further processing.

An exemplary analog FDM signal to be received by the receiver 10, is a multiplexed group of about 2700 individual 3.4 kHz wide audio signals (channels) having 4 kHz center-to-center spacings. However, these signal parameters are for purposes of illustration only and those skilled in the art will ready recognize the applicability of the teachings of the present invention to other signal parameters and frequency ranges. The receiver 10 is also illustrative and those skilled in the art are familiar with a variety of apparatus useful in achieving the same reception and conversion functions.

Where desired, an antialiasing function or filter can be applied to the analog FDM signal in a filter stage 1B prior to conversion into a digital signal in an analog-to-digital (A/D) converter stage 20. The converter 20 provides the signal in digital form for further processsing, and comprises one of a variety of known A/D converters. The converter 20 is operated at a preselected clocking frequency $f_s$, determined by the timing required for a given signal transfer rate, signal bandwidth, and the resolution desired for the analog-to-digital conversion process.

After conversion to a digital form, the received FDM signal is introduced into a Hilbert transformation stage 22 to provide a digital analytical FDM signal on the real and imaginary output buses 24 and 26 for subsequent processing. A Hilbert transformer is simply a lowpass half-band filter that has been frequency shifted such that its center frequency is located at one quarter of the sampling frequency. It is a means to make a real signal into an analytic signal, a signal which has no components in the frequency domain between 0 and $-\omega_s/2$. Those skilled in the art are familiar with a variety of Hilbert transformation apparatus useful in making the invention. An exemplary Hilbert transformer useful for this stage would be a quadrature filter.

Figure 2:
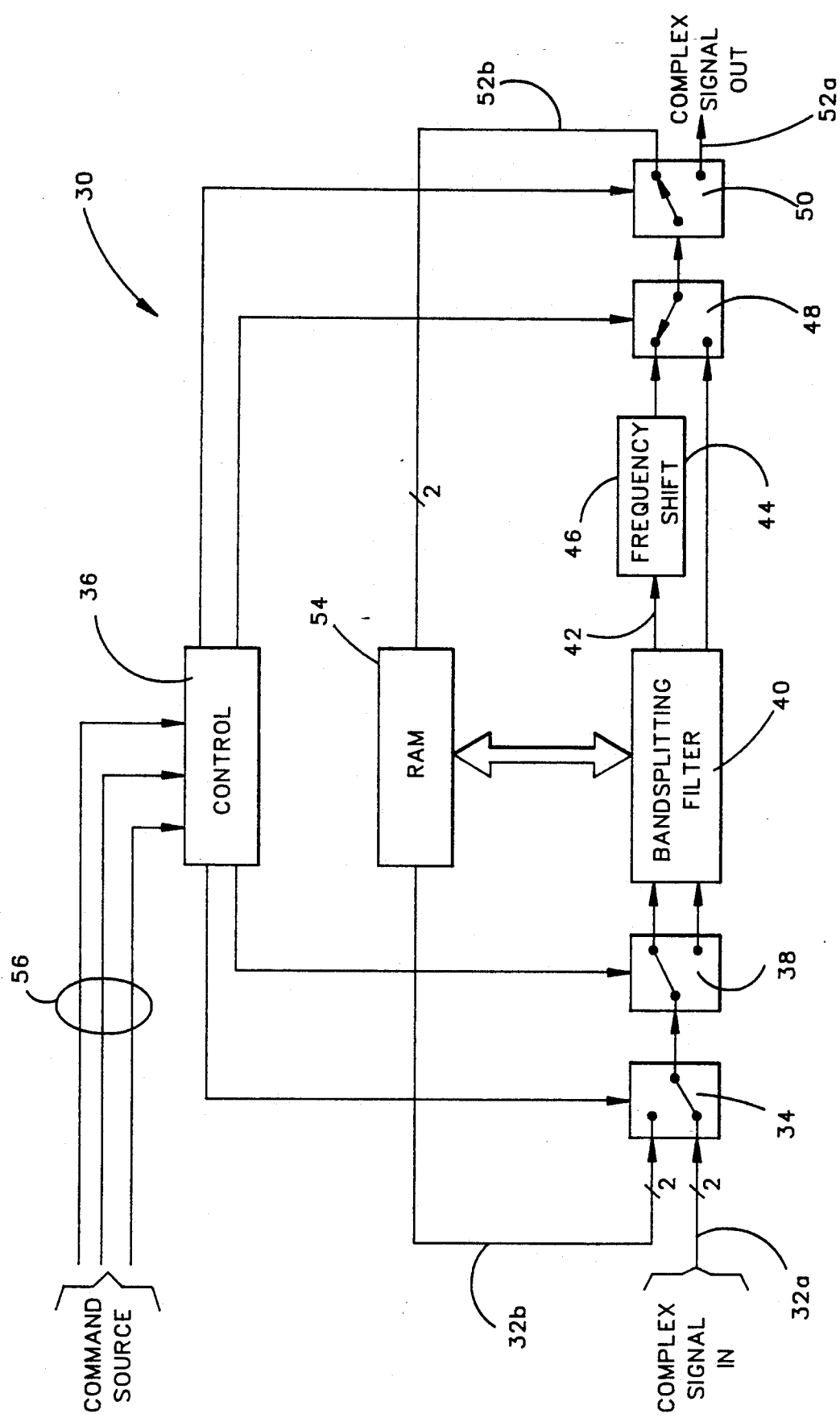
FIG. 2 illustrates an overview of a signal selection apparatus constructed according to the principles of the present invention.

The output of the receiver 10 of FIG. 1, or similar FDM receivers, is provided as an input to a circuit 30 for extracting one from many frequency division multiplexed signals including a band-splitting filter 40. One embodiment of the extracting circuit 30 of the present invention is illustrated in FIG. 2. It should be noted that the extraction circuit 30 includes the bandsplitting filter 40. In FIG. 2, the extracting circuit 30 samples analytic signals of the FDM-type at a predetermined rate along the input lines 32a or 32b. The illustrated buses are multi-bit wide complex data buses. That is, they are representative of the two real and imaginary inputs, 24 and 26, provided from the receiver 10. In the exemplary embodiment, the input bus 32a is connected to the receiver 10 output. The sampling rate for this input is typically chosen to be about $2^{15}$ Kilosamples per second (Ks/sec).

A sample source selector 34 is used to determine the source of data to be processed, as discussed further below. The selector is typically one of many electronic switching elements known in the art and can be highly miniaturized. The state of the selection element or switch 34 is generally controlled by a central controller or control processor 36. The controller 36, also discussed below, determines which data b 32a or 32b, is used for inputting data to the extracting circuit 30, as well as other input and output parameters or settings.

The data samples are passed through a decimation and multiplexing device 38 to a bandsplitting filter 40, which has an upper half-band output 42 and a lower half-band output 44. This configuration effectively divides the frequency spectrum of the input signal to the band-splitting filter 40 into two halves, with the half-band of interest being selected for further processing and the other half-band being discarded.

Due to the sampled-data nature of the extracting circuit 30, input signals must fall within a frequency band extending from 0 to one-half of the sampling frequency $\omega_s$ ($\omega_s/2$). This band is occupied by the 2700, 4kHz wide (center-to-center) channels from which one is to be selected. For purposes of the present invention this band is sub-divided into a lower half-band region extending from 0 to $\omega_s/4$, and an upper half-band region extending from $\omega_s/4$ to $\omega_s/2$. Since $\log_2 2700 = 11.34 < 12$, a sampling frequency of $\omega_s \geq 2 \times 4$ kHz $\times 2^{12} = 32.768$ Megasamples per second (Ms/sec) is specified.

By performing the frequency splitting operation twelve times on the input sample set, any single channel of interest can be selected from a group of scanned channels. The controller 36 can use 12-bit selection commands on command buses 56 to determine whether the upper or lower frequency half-band is selected on each of the twelve filtering passes. A binary sequence can be used to describe or select a desired band by using the notation 1=Upper and 0=Lower. Therefore, the most significant bits in a sequence such as 10100 . . . would choose the upper band on the first pass, the lower band on the second, upper band on the third, and so forth, essentially translating the input to ULULL . . . . Such a 12-bit command word is simply the binary representation of the frequency slot of interest. However, other command word sizes and instructions can be used where desired. The desired frequency or sequence of half-band selections can be preprogrammed and stored in the controller 36 or the RAM 54 and accessed during operation or dynamically adjusted during operation.

The band-splitting filter 40 is configured so that the upper half-band output which contains frequencies between $\omega_s/4$ and $\omega_s/2$, are subsequently complex frequency shifted downward using a frequency down-shifter 46, to a frequency band extending between 0 and $\omega_s/4$. After this complex frequency down-shifting operation, which occurs automatically on each pass of the band-splitting filter 40, a band selector 48 is used to select the half-band of interest. It should be noted that the usable band for the circuit 30 of FIG. 2 operation residues between 0 and $\omega_s/2$.

The new half-band filtered digital FDM signal is transferred through an output data bus selector or recirculation switch 50 which transfers it to one or more output buses 52. In the embodiment of FIG. 2 there are two output data buses, 52a and 52b. The data bus 52a is used to transfer the data to other apparatus. The data bus 52b is used to recirculate the output data transferring it back to the input data bus 32b of the extracting circuit 30, where it is again filtered, band-shifted and subjected to an upper/lower half-band selection operation. In order to facilitate the proper timing of the recirculation function at high data rates and with large data samples, a transient memory or storage element 54 is preferably employed in the loop between the filter output bus 52b and input bus 32b. This provides temporary storage of the digital signal samples before each subsequent pass. The specific timing of this storage and recirculation may vary with the application.

After twelve passes of the digital signal data through the extracting circuit filter 30, a preselected 4 kHz wide signal, plus some noise, will be selected from the 2700 (up to 4096 for 12 passes) possible frequency channels. The desired signal is then noise filtered in an output-shaping stage prior to application to other apparatus.

Figure 3A:
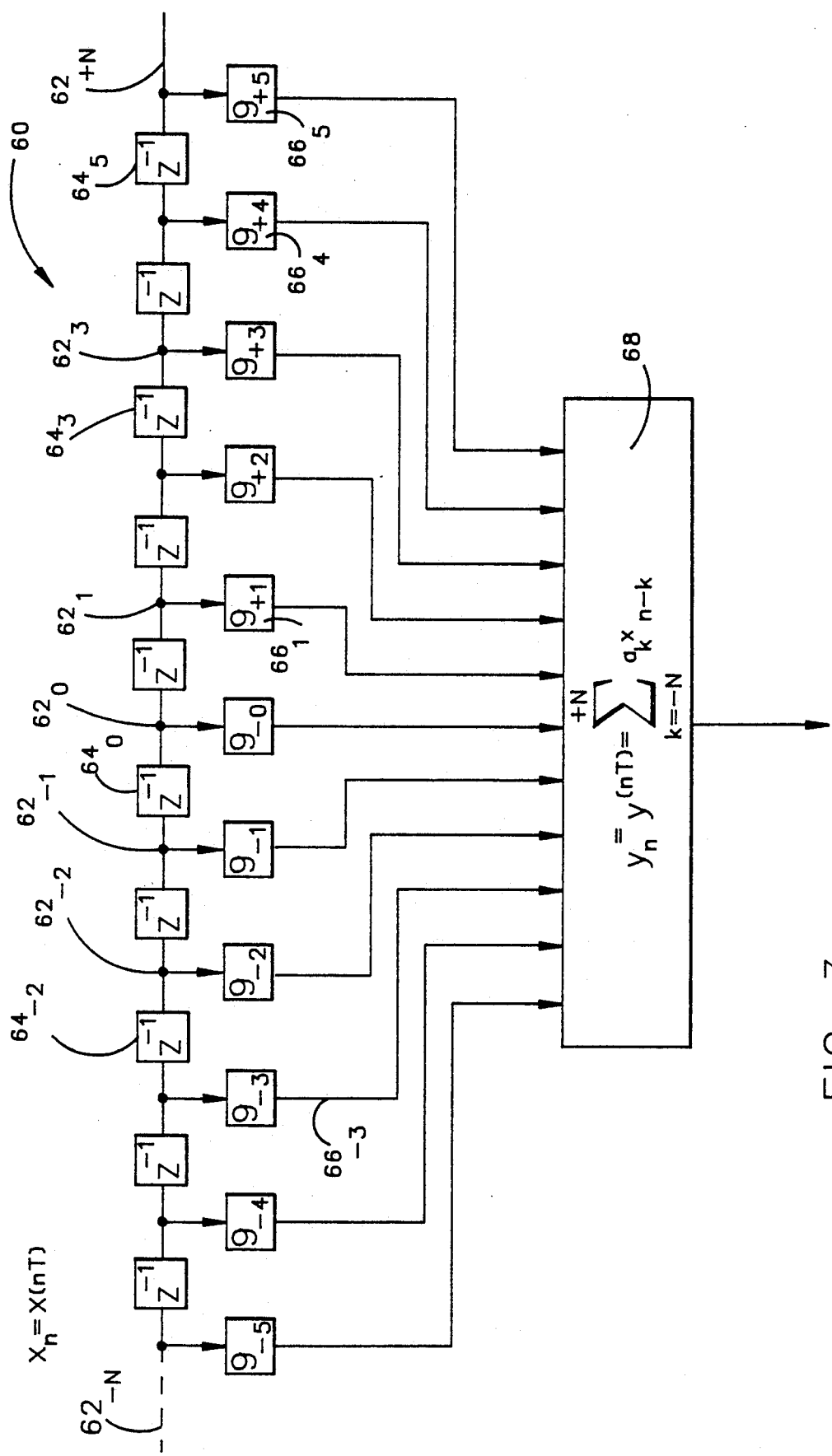
FIG. 3a illustrates an ideal linear FIR filter useful in describing the operation of bandsplitting filters.

To see how the present invention functions, first examine ideal and acceptable filter responses on which it is based. An ideal half-band finite-impulse-response (FIR) filter is illustrated in FIG. 3a. In FIG. 3a, the filter 60 generally transfers an input signal $x_n$ along a delay line having a series of filter taps $62_k$, where $-N \leq k \leq N$, each located after one of a series of unit time delays $64_k$.

Figure 3B:
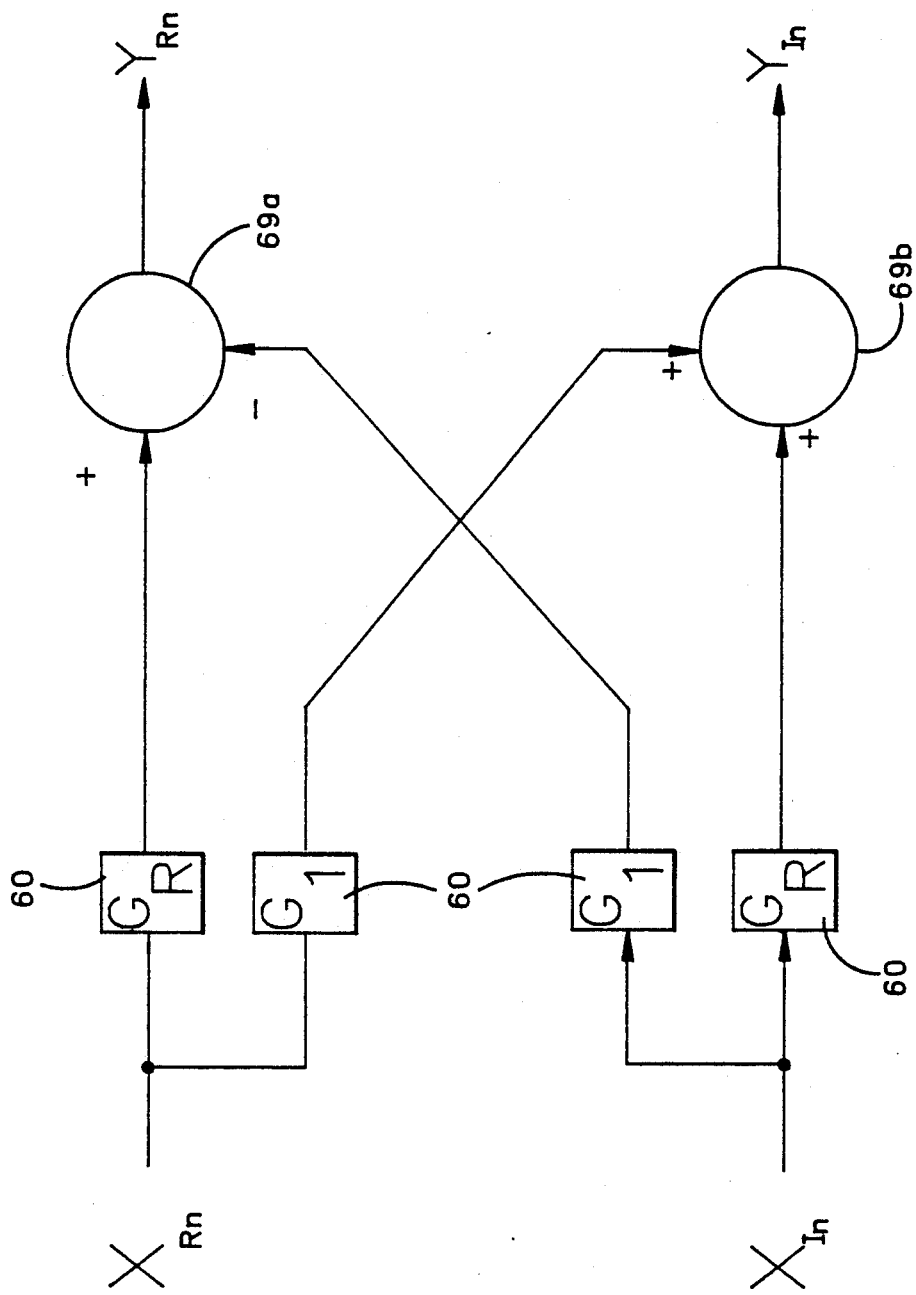

The application of the FIR filter of FIG. 3a to complex data samples would require four FIR filters 60 having their respective outputs connected to two summation or adder elements 69a and 69b as illustrated in FIG. 3b. The real data signal input to the filter would be denoted as $x_{Rn}$ and the imaginary signal as $x_{In}$. The filter structure of FIG. 3b provides a filter transformation of $G = G_R + jG_I$ which is discussed further below.

In the embodiment of FIG. 3a, the input signal comprises a series of data samples separated by a delay of T seconds each, and the unit time of delay for each delay element $64_k$ is 1 sample time of T seconds. Therefore, the delay value for each delay element $64_k$ is illustrated in FIG. 3 as $z^{-1}$. The output from each tap $62_k$ has a tap weight or coefficient $g_k$ applied to it by a weighting element such as, but not limited to, a multiplier $66_k$.

The weighted tap outputs are then summed in the adder 68 to provide the desired output signal:

$$y_n = y(nT) = \sum_{k=-N}^{N} g_k x_{n-k}, \quad (1)$$

and the filter transfer function is described by the relationship:

$$G(z) = \sum_{k=-N}^{N} g_k z^{-k}, \quad (2)$$

where $g_k$ represents the filter coefficients applied by the multipliers 66. The coefficients required for filter weighting of complex data are determined by multiplying the $k^{th}$ lowpass filter coefficient by $e^{(jk\omega_o T)}$, where $\omega_o$ is the frequency shift being imposed ($\omega_s/8$ or $3\omega_s/8$). The filter coefficients are derived according to the relationship:

$$g_k = w_k \left| \frac{\sin \pi k/2}{\pi k/2} \right| e^{-2\pi jk(\omega_o/\omega_s)}, \quad (3)$$

where $w_k$ is a window coefficient and the exponential factor accommodates the processing of complex data values.

If the filter 60 is configured to have a particular filter function with a gradual slope between the pass band and the stop band, it can be shown that highly efficient filtering is achieved. FIG. 4 illustrates frequency spectra and frequency response relationships useful in the operation of the filter 60 and in designing the invention. In FIG. 4a, the repeating frequency response of a lowpass (lower half-band) version of the filter 60 is shown having infinitely vertical "skirt" sides (transitions) for the frequency response due to an infinite number of coefficients ($N = \infty$ in eqs. 1 and 2). In FIG. 4b, an acceptable filter output is shown which results from using a smaller number of filter coefficients. That is, a degradation in the cut-off characteristics of the filter between the pass-band and the stop-band can be accepted in order to use fewer coefficients and, thus, simple mechanization ($N << \infty$ in eqs. 1 and 2). As will be apparent to those skilled in the art, this is a natural result from "windowing" or restricting the number of coefficients.

In the present example of FIG. 4b, the transition width, sloping skirt, is permitted to be equal to the passband width and twenty-five percent of the sampling frequency. $\omega_s$. The specific requirements of each filter application dictate how much in-band ripple and out-of-band leakage is tolerable. A natural consequence of a windowed design for the filter 60 is that passband and stopband ripple are substantially equal. Weighted-error or other optimization filter designs could also be chosen.

The low-pass filter 60 can have its frequency response shifted so that the flat bandpass extends from 0 to $\omega_s/4$. This is illustrated in the frequency response curve of FIG. 4c. In FIG. 4c, the spectrum of the applied signal has had the bandwidth divided in half. Assuming a broadband noise input, the filter shape is also the scaled output spectrum. A decrease by a factor of two in the bandwidth allows a decrease in the sampling frequency by a factor of two. This means that dropping every other sample would result in the spectrum illustrated in FIG. 4d. This provides overlapping stop- and pass-band edges which are aligned and thus, do not generate fold over or aliasing distortion. The region between 0 and $\omega_s/4$ is the passband of interest and the contributions from adjacent bands have nearly decreased to zero within the filter passband.

In FIG. 4e, the frequency response of the filter 60, when reconfigured for an upper half-band filter, is shown being shifted to extend between $\omega_s/4$ and $\omega_s/2$. In FIG. 4f, after dropping every other sample, no interference is shown for aliasing extending into the passband of the filter.

For a lowpass filter, setting $\omega_o = \omega_s/8$ in equation 3 provides coefficients $g_{kL}$ defined by the relationship:

$$g_{kL} = \frac{2w_k}{\pi k} \sin \frac{\pi k}{2} \left[ \cos \frac{\pi k}{4} + j\sin \frac{\pi k}{4} \right] \quad (4)$$

$$\left\{ \begin{array}{c} \text{com.} \\ \text{gain} \end{array} \right\} \left\{ \begin{array}{c} \text{band-} \\ \text{width} \end{array} \right\} \left( \begin{array}{c} \text{passband center} \\ \text{frequency} \end{array} \right)$$

$$= g_{kR} + jg_{kI} \quad (5)$$

For a highpass filter, setting $\omega_0 = 3\omega_s/8$ in equation 3 provides coefficients $g_{kH}$ defined by the relationship:

$$g_{kH} = \frac{2w_k}{\pi k} \sin \frac{\pi k}{2} \left[ \cos \frac{3\pi k}{4} + j\sin \frac{3\pi k}{4} \right] \quad (6)$$

$$= \frac{2w_k}{\pi k} \sin \frac{\pi k}{2} \left[ -\cos \frac{\pi k}{4} + j\sin \frac{\pi k}{4} \right]$$

$$= -g_{kR} + jg_{kI}$$

and $$g_{kR} = h_k S_k; \; g_{kI} = h_k U_k; \; h_k = \begin{cases} 0 & k \text{ even}, k \neq 0 \\ \frac{\sqrt{2} \, w_k}{\pi |k|} & k \text{ odd} \\ 1 & k = 0 \end{cases}$$

$$S_k = (-1)^{\frac{|k|}{4}} \quad \text{and} \quad U_k = (-1)^{\frac{|k|}{4}+2} \text{ sign } k$$

where $S_k$ and $U_k$ are used to adjust the sign of $g_k$ to account for the symmetry of the coefficients on either side of the center tap while allowing the use of $N/2$ or $N/2+1$ multiplications in the filter, as discussed below.

The transform of the complex input to the filter is $(X_R + jX_I)$, the transfer function of the filter is $(G_R + jG_I)$, and the transform of the complex output from the filter is $(Y_R + jY_I)$ where:

$$Y = (X_R + jX_I)(G_R + jG_I) \quad (7)$$
$$= (X_R G_R - X_I G_I) + j(X_R G_I + X_I G_R)$$
$$= Y_R + jY_I$$

with
$$Y_R = X_R G_R - X_I G_I, \quad (8)$$
and
$$Y_I = X_R G_I + X_I G_R \quad (9)$$

Where the filter is divided into the lower and upper passbands with the outputs:

$$Y_L = Y_{RL} + jY_{IL}, \quad (10)$$

and $$Y_H = Y_{RH} + jY_{IH}, \quad (11)$$

the filter coefficients are related by the vector-relationship:

$$\begin{bmatrix} Y_{RL} \\ Y_{IL} \\ Y_{RH} \\ Y_{IH} \end{bmatrix} = \begin{bmatrix} G_{RL} & -G_{IL} \\ G_{IL} & G_{RL} \\ G_{RH} & -G_{IH} \\ G_{IH} & G_{RH} \end{bmatrix} \begin{bmatrix} X_R \\ X_I \end{bmatrix} = \begin{bmatrix} G_R & -G_I \\ G_I & G_R \\ -G_R & -G_I \\ G_I & -G_R \end{bmatrix} \begin{bmatrix} X_R \\ X_I \end{bmatrix}$$

OR:

$$Y_{RL} = X_R G_R - X_I G_I = X_R z^{-N} + X_R A(z) - X_I B(z), \quad (12)$$

$$Y_{IL} = X_R G_I + X_I G_R - X_R B(z) + X_I z^{-N} + X_I A(z), \quad (13)$$

$$Y_{RH} = X_R G_R - X_I G_I = X_R z^{-N} - X_R A(z) - X_I B(z), \quad (14)$$

and $$Y_{IH} = X_R G_I - X_I G_R - X_R B(z) + X_I z^{-N} - X_I A(z), \quad (15)$$

where N is an even number but only odd filter taps have nonzero coefficients and:

$$G_R = \sum_{k=-N}^{N} g_{kR} z^{-(k+N)} = \quad (16)$$

$$z^{-N} + \sum_{\substack{k=-N \\ k=\text{odd}}}^{N} g_{kR} z^{-(k+N)} = z^{-N} + A(z),$$

and $$G_I = \sum_{\substack{k=-N \\ k=\text{odd}}}^{N} g_{kI} z^{-(k+N)} = B(z), \quad (17)$$

OR $$A(z) = g_1(z^{-(N+1)} + z^{-(N-1)}) + g_3(z^{-(N+3)} + z^{-(N-3)}) - \quad (18)$$

$$g_5(z^{-(N+5)} + z^{-(N-5)}) + \ldots + g_k(z^{-(N+k)} + z^{-(N-k)}),$$

and $$B(z) = g_1(z^{-(N+1)} - z^{-(N-1)}) - g_3(z^{-(N+3)} - z^{-(N-3)}) - \quad (19)$$

$$g_5(z^{-(N+5)} - z^{-(N-5)}) + \ldots + g_k(z^{-(N+k)} - z^{-(N-k)})$$

Returning for a moment to FIG. 3, the number of taps required for the prototype filter equals 2N+1, where the "half-order," N can be obtained from the relationship:

$$N = (A - 7.95/28.72\Delta_t)\omega_s,$$

rounded to the next integer value, where $\Delta_t$ is the transition bandwidth or spacing between the passband and the stopband.

For a normalized transition width of $\omega_s/4$, the stopband attenuation A, in dB, can be tabulated as a function of the half-order N of the filter. In general, there exist 2N+1 taps 62 each having a weighting multiplier 66 associated with it. One of the taps weights; $g_o$, is generally unity and half of the remaining 2N tap weight coefficients are zero since this is a half-band filter. This means that each filter only requires N multipliers 66. The magnitudes of the tap weights are also symmetrical about a center tap, which allows the use of N/2 multiplications per input sample.

Using a Kaiser windowing type filter design, the values of N for corresponding attenuation values of A are shown in Table I below.

TABLE I

| N | 4 | 5 | 6 | 7 | 8 | 9 | 10 |
|---|---|---|---|---|---|---|----|
| A(db) | 37 | 44 | 51 | 58 | 65 | 72 | 79 |

Therefore, if the design criteria for the filter require at least a 50 dB noise isolation factor then an N value of six is chosen, if higher values are needed for A then larger values are used for N and so forth. For purposes of illustration, and in line with constructing a preferred embodiment for typical applications, the value of N is selected as six for the exemplary design provided below. Setting N equal to six and k=odd only, A(z) and B(z), from above, become:

$$A(z) = g_1(z^{-7} + z^{-5}) + g_3(z^{-9} + z^{-3}) - g_5(z^{-11} + z^{-1}) \quad (20)$$

and $$B(z) = g_1(z^{-7} - z^{-5}) - g_3(z^{-9} - z^{-3}) - g_5(z^{-11} - z^{-1}) \quad (21)$$

or if a single common delay operation is removed (accomplished elsewhere in the processing chain):

$$A(z) = g_1(z^{-6} + z^{-4}) + g_3(z^{-8} + z^{-2}) - g_5(z^{-10} + 1) \quad (22)$$

and $$B(z) = g_1(z^{-6} - z^{-4}) + g_3(z^{-8} - z^{-2}) - g_5(z^{-10} - 1) \quad (23)$$

Complex coefficients are presented in Table II for taps −6 through +6.

TABLE II

| | LOWPASS FILTER | | HIGHPASS FILTER | |
|---|---|---|---|---|
| k | REAL | IMAG | REAL | IMAG |
| −6 | 0 | 0 | 0 | 0 |
| −5 | −g5 | g5 | g5 | g5 |
| −4 | 0 | 0 | 0 | 0 |
| −3 | g3 | g3 | −g3 | g3 |
| −2 | 0 | 0 | 0 | 0 |
| −1 | g1 | −g1 | −g1 | −g1 |
| 0 | 1 | 0 | 1 | 0 |
| 1 | g1 | g1 | −g1 | g1 |
| 2 | 0 | 0 | 0 | 0 |
| 3 | g3 | −g3 | −g3 | −g3 |
| 4 | 0 | 0 | 0 | 0 |
| 5 | −g5 | −g5 | g5 | −g5 |
| 6 | 0 | 0 | 0 | 0 | where $g_5 = 0.015562354$, $g_3 = 0.086816930$, and $g_1 = 0.424926824$

As a first step in mechanizing the invention, every other tap position in the structure of FIG. 3 can be eliminated since there is a weighting factor of zero at each of those positions. Furthermore, it was discovered that the weighting factors can be applied before the delay operations associated with a given tap position, and the symmetrically distributed weighting factors groups. That is, the weighting factor is the same for both +N and −N positions except for the delay periods and a single weighting coefficient can be used with each of two delay functions (+N and −N) and applied before the delay. The resulting structure employs only N+1 multipliers and is illustrated in FIGS. 5 and 6.

Figure 5:
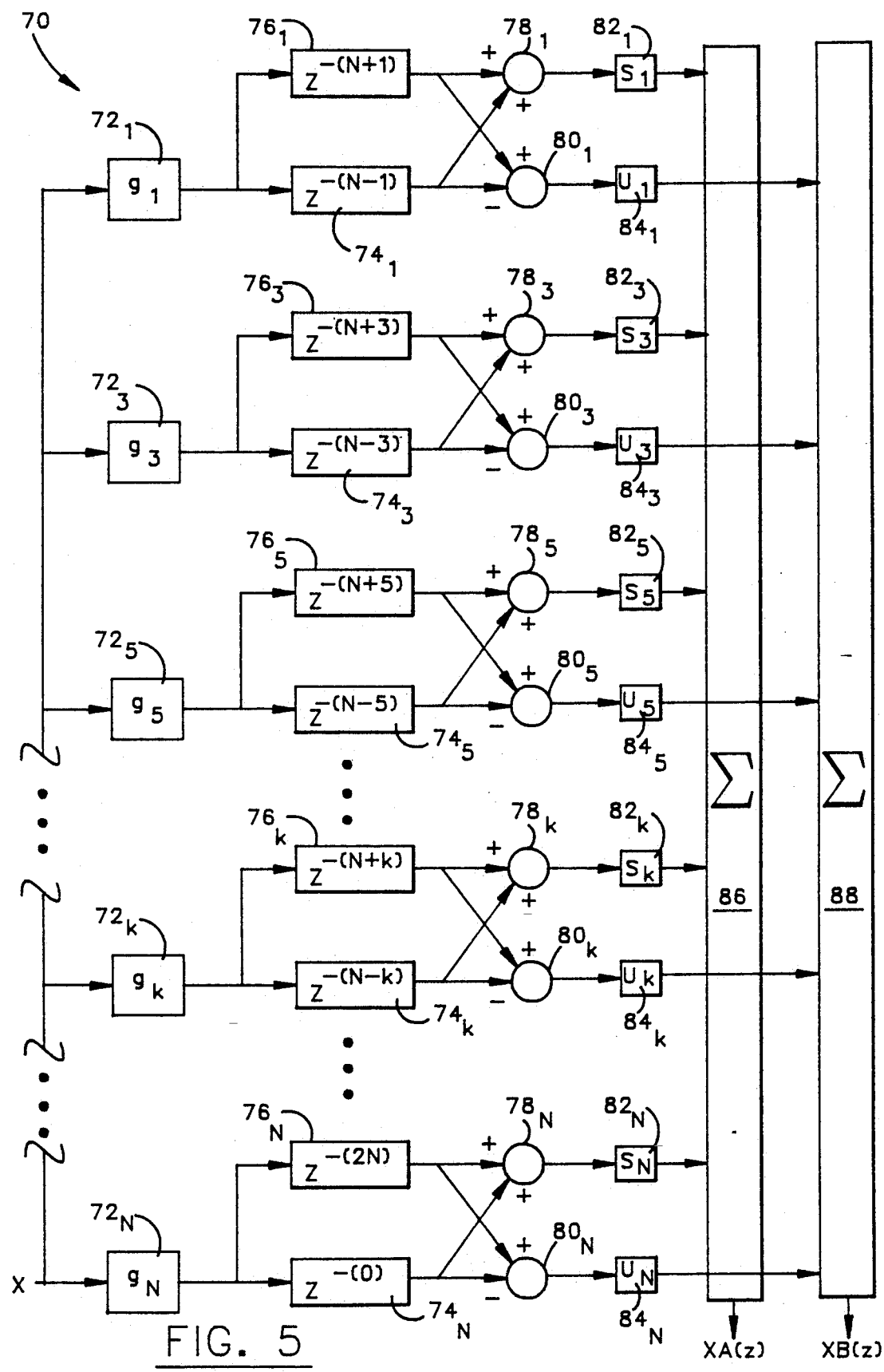
FIG. 5 illustrates a schematic of a portion of a bandsplitting filter useful for generating certain composite data sample signals.

In FIG. 5, the weighting coefficients $g_k$, for all odd valued k>1 up to N, are applied to the data samples using k multipliers, where k ranges from 1 to N, labeled $72_1$ through $72_N$. The output from each multiplier $72_k$ is then subjected to delay in corresponding delay elements $74_k$ and $76_k$ which are connected in parallel. The delay elements $74_k$ each apply a delay of N−k unit time periods in duration while the delay elements $76_k$ each apply a delay of N+k unit time periods. The delay elements $74_k$ are analogous to the delay elements $64_{-N}$ on the left of the center tap in FIG. 3, and the delay elements $76_k$ are analogous to the delay elements $64_{+N}$ to the right of the relative center tap position in FIG. 3.

The outputs of the two delay elements $74_k$ and $76_k$ are connected to two associated summation elements or adders $78_k$ and $80_k$. The delayed outputs at each $k^{th}$ filter position are added together in each adder $78_k$ to generate k weighted, delayed, sums. At the same time, the N−k delayed output is subtracted from the N+k delayed output in each adder $80_k$ to generate k weighted, delayed, differences. The output of the adder $78_k$ is connected to an adjusting element or multiplier $82_k$ and the output of the adder $80_k$ is connected to an adjusting element $84_k$. The adjusting elements $82_k$ and $84_k$ adjust, or maintain, the signs of the sums and differences from the summation elements $78_k$ and $80_k$ in accordance with the sign factors for equations 5 and 6 above. The k separate sums are then added together in a central summation element or adder 86 to provide a first composite signal XA(z) and the k separate differences are also added together in a central summation element 88 to provide the second composite signal XB(z). As will be apparent to those skilled in the art, there are first and second composite signals for both the real data samples and the imaginary data samples generated in this manner which results in the outputs $X_RA(z)$, $X_RB(z)$, $X_IA(z)$, and $X_IB(z)$ from four summation elements $86_R$, $88_R$, $86_I$, $88_I$.

Figure 6:
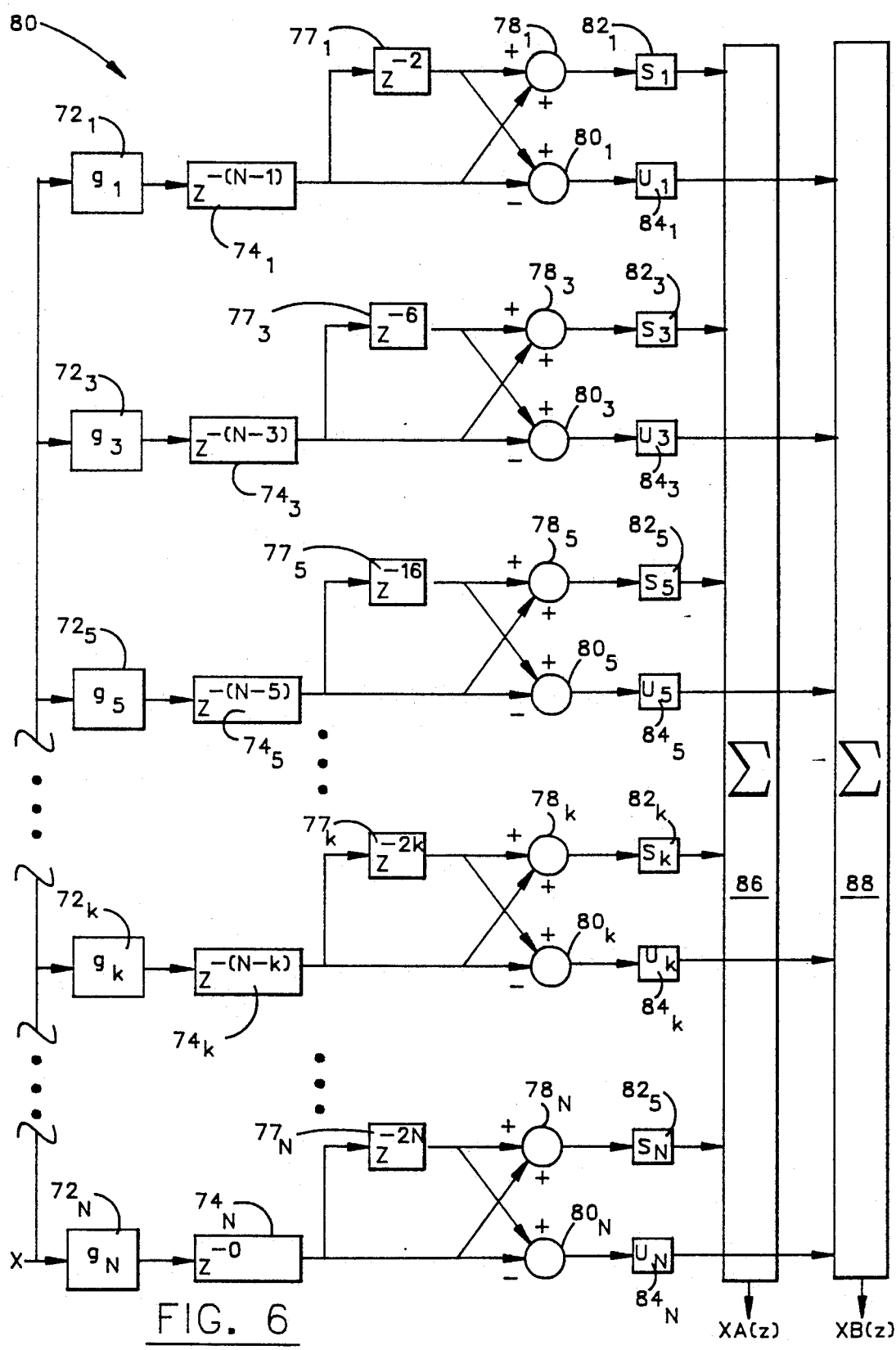
FIG. 6 illustrates a schematic of an alternate embodiment for the filter portion of FIG. 5.

As an alternative, the delay elements can be placed in series as shown in FIG. 6. In FIG. 6, the delay elements $76_k$ have been replaced by the delay elements $77_k$ which are connected in series with the delay elements $74_k$ instead of in parallel. In order to achieve the same N+k unit delay time values, the delay elements $77_k$ implement a delay of 2k unit time periods on the already N−k delayed data samples.

Figure 7:
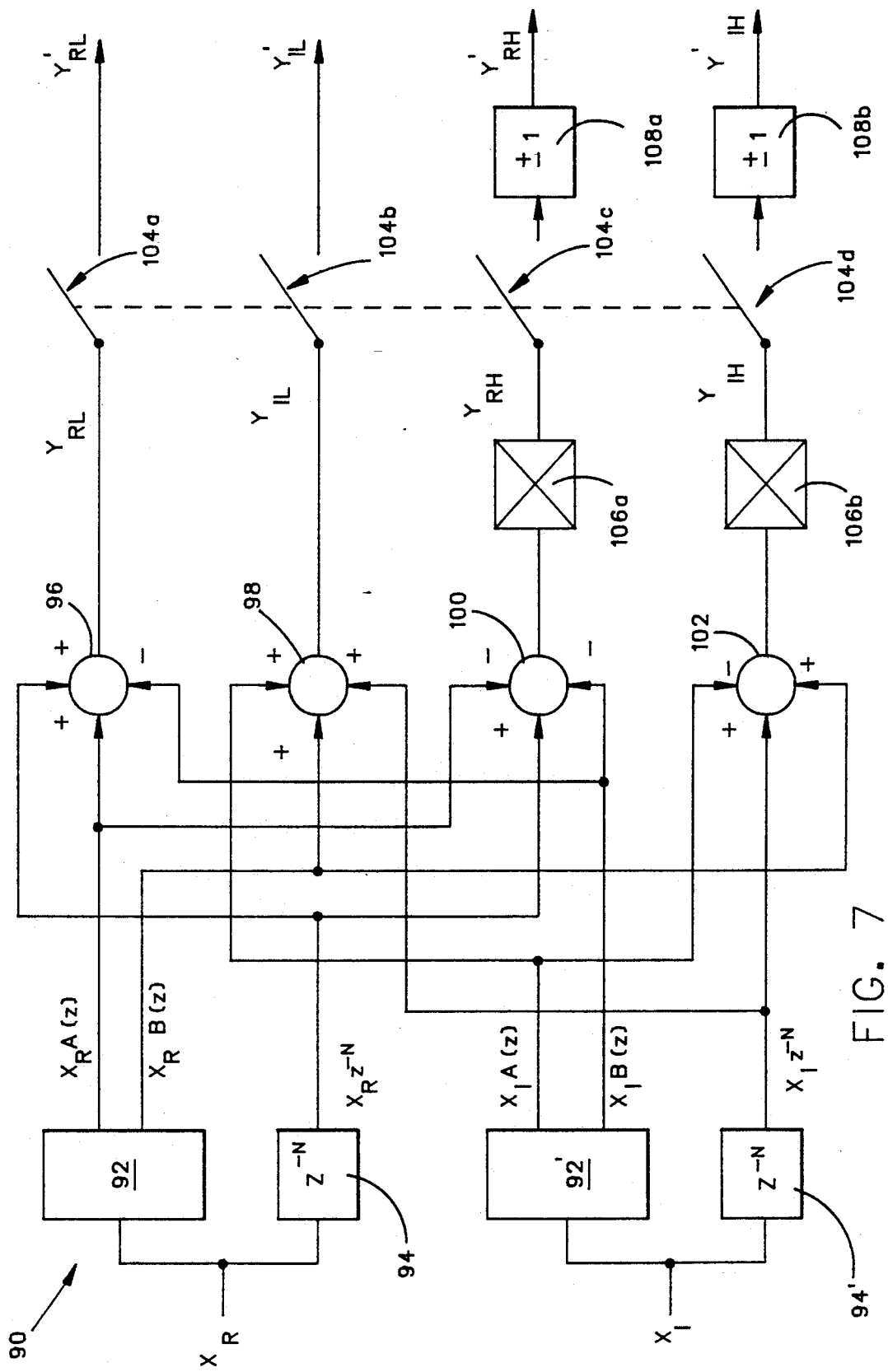
FIG. 7 illustrates a schematic of a bandsplitting filter useful in implementing the invention and employing the composite signal portion of FIG. 5.

To realize a successful mechanization of a complete embodiment of the present invention in accordance with the parameters of equations 12 through 15, above, there are additional processing requirements that must be added to the structure of FIGS. 5 or 6. FIG. 7 illustrates one embodiment of a bandsplitting filter operating according to the present invention in which the additional processing steps and elements needed for generation of the desired upper and lower half-band signals have been added.

In FIG. 7, a bandsplitting filter 90 is shown employing the basic filtering structure of FIGS. 5 or 6 two times. Once as a real data sample composite signal processing element 92, and once as an imaginary data sample composite signal processing element 92'. These two composite signal processing elements provide the $X_RA(z)$ and $X_RB(z)$, and $X_IA(z)$ and $X_IB(z)$ signals.

At the same time the A(z) and B(z) signals are being generated for values of k greater than zero, the zeroth ($0^{th}$) order or k equal zero delayed data is being processed by delay elements 94 and 94' for real and imaginary data samples, respectively. In this embodiment, the zeroth order data is delayed for N unit time periods to form the signals $X_Rz^{-N}$ and $X_Iz^{-N}$ before being combined with the other data.

There are four summation elements, or adders, which are connected to the outputs of the composite processing elements 92 and 92', and the delay elements 94 and 94'. A first adder 96 receives the $X_RA(z)$ output from the processing element 92, the $X_Rz^{-N}$ output from the delay element 94 and adds them together and subtracts the $X_IB(z)$ output it receives from the composite processing element 92'. The output of the adder or summation element 96 represents the lower half-band real output signal $Y_{RL}$. A second adder 98 receives the $X_IA(z)$ output from the processing element 92', the $X_Iz^{-N}$ output from the delay element 94', and the $X_RB(z)$ output from the processing element 92, and adds them together. The output of the adder or summation element 98 represents the lower half-band imaginary output signal $Y_{IL}$.

A third adder 100 subtracts the $X_RA(z)$ output from the processing element 92 from the $X_Rz^{-N}$ output from the delay element 94, and subtracts the $X_IB(z)$ output from the composite processing element 92'. The output of the adder element 100 represents the upper half-band real output signal $Y_{RH}$. A fourth adder 102 receives the $X_RB(z)$ output from the processing element 92, to which it adds the $X_IA(z)$ output from the processing element 92' and subtracts the $X_Iz^{-N}$ output from the delay element 94'. The output of the adder 102 represents the upper half-band imaginary output signal $Y_{IH}$.

The lowpass or lower half-band filter outputs $Y_{RL}$ and $Y_{IL}$ are decimated by a factor of two. This is accomplished by dropping every other sample or ignoring or disregarding the outputs every other sample period. A simple structure for acomplishing this operation is an electronic switch 104 placed in series with each of the outputs. In FIG. 7, this is illustrated as switches $104a$ and $104b$. It is readily apparent that these two switches can be implemented as a single, multi-pole switching device that is controlled from the controller 36 previously discussed.

The highpass or upper half-band filter outputs $Y_{RH}$ and $Y_{IH}$ must undergo a complex shift to move them into the lowpass band. This is accomplished by multiplying each sample in an output signal sequence by:

$$e^{-2\pi jk(3/8-1/8)} = e^{-\pi jk/2} = 1, -j, -1, j, 1, -j, \ldots$$

This is done in the multipliers $106a$ and $106b$ which are connected in series with the outputs from the adders 100 and 102, respectively. The upper half-band outputs are then decimated by dropping the j-scaled values. This is equivalent to disregarding these outputs every other sample period and complementing alternate output samples on the $Y_{RH}$ and $Y_{IH}$ out A simple structure for accomplishing this operation includes the electronic switches $104c$ and $104d$ placed in series with these outputs and complementing elements $108a$ and $108b$ connected in series with the switching elements. It is readily apparent that these two switches can also be implemented as a single multi-pole switching device, alone or in combination with the switches $104a$ and $104b$, that is controlled from the controller 36.

The above equations show that the multiplier stages, coefficient weighting, operate only on the even-numbered input samples and that the center tap operates only on the odd-number samples. Since the filter output is going to be decimated by fifty percent, or a factor of two, the filtering and decimation operations can be combined at the beginning of each filtering stage or circulation. This removes fifty percent of the computational load from the circuitry used to construct the filter 90 (or 30). Since all even-numbered samples are multiplied by $g_1, g_3, \ldots g_k$, these multiplications can be accomplished at the front of the filtering process.

Figure 8:
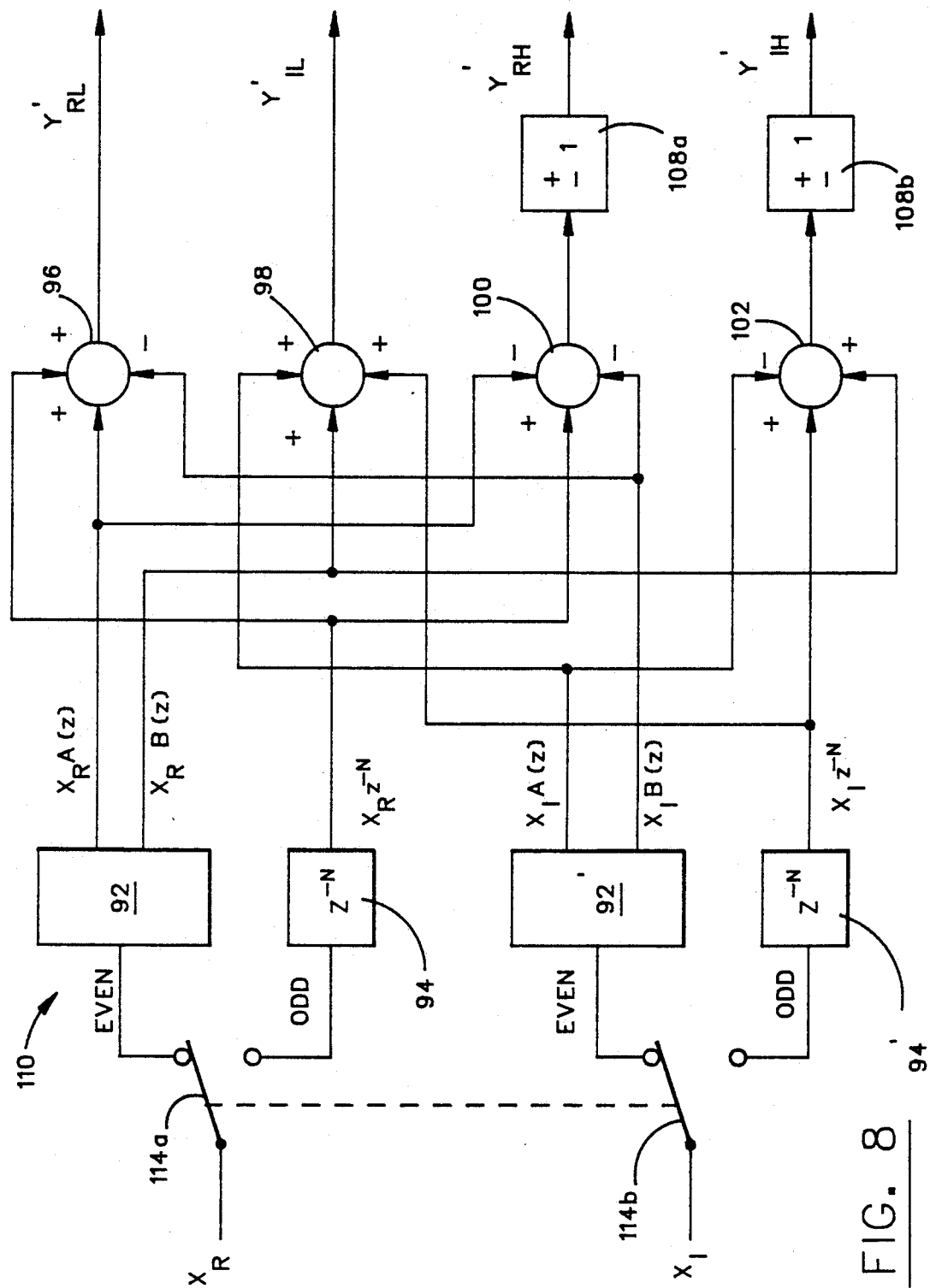
FIG. 8 illustrates another embodiment of the bandsplitting filter of FIG. 7 wherein data sample decimation is accomplished as an input function.

Using the resulting decimation steps and multiplication structure, an alternate embodiment for the bandsplitting filter of FIG. 7 can be constructed as illustrated in FIG. 8. In FIG. 8, a bandsplitting filter 110 is shown employing the same processing elements 92, 92', 94, 94', summation elements 96, 98, 100, and 102, and complementing elements 108a and 108b as in FIG. 7. However, the switching elements 104a, 104b, 104c, and 104d have been removed from the output side and replaced with the switching elements 114a and 114b on the input side of the filter. The switches 114a and 114b are configured to direct the odd numbered data samples into the delay processing elements 94 and 94' and the even numbered data samples into the composite signal processing elements 92 and 92'. Therefore, the operation of the switches 114a and 114b define the operations of the switching structure 38 in FIG. 2.

The filters 90 or 110, as described, are used for the half-band filter 40 of FIG. 2. To realize a single channel selection or extraction from the C-channel input FDM analytical signal, the input signal will have to be half-band filtered $\log_2 0$ times. In the exemplary 2700-channel application, this would translate to twelve times. However, in the present invention the processing rates for each succeeding half-band filtering and selection cycle are cut in half due to the factor of two decimation. The sample processing rate decimation associated with the sample selection decimation allows the half-band-selection operation utilized in the present invention to be multiplexed using a single filter 90 or 110 and not a series of twelve such filters. That is, instead of twelve separate filters cascaded physically in series and operating on the data over a period of time, the data is cascaded in time through a single filter, being transferred back or recirculated through the filter input at the end of each processing period.

To further clarify this operation, a single filter, time cascaded, operation is illustrated graphically using a series of relative time lines in FIG. 9. In FIG. 9, the top time line labeled time line 1 represents the sequence for clocking data through the digital filter 110 (40) when it is operating at twice the necessary sampling rate for the data. As discussed above, a sampling rate for data of $2 \times 4 \times 2^{12} = 32.768$ Ms/sec provides for a filter clock rate of about 65.536 MHz, which is within current circuit technology. The reduction of the processing rate requirement because of the even/odd sample processing scheme reduces the sampling rate to $2^{15}$ Ks/sec or 32.768 Ms/sec.

In FIG. 9, along time line 1 each time period in the timing sequence in which data is processed is labeled by the numeral 1 (pass 1 data) and the remaining, open or unused, time periods with an ×(no data). The unused time periods can be allocated to other functions such as self testing or other processing. As the bandwidth-reduced data output from the filter 110 is decimated and every other sample recirculated through the filter 110, the input samples are processed at a sampling rate one-half of the initial, or previous, input rate, for a decrease to $2^{14}$ Ks/sec. or about 16.382 Ms/s. The sequencing of this data, pass two data, is illustrated on time line 2 of FIG. 9 where the second-pass data is denoted by the numeral 2. Notice that the previously unused time slots are now partially consumed by the second pass processing.

The again reduced-bandwidth signal data output from the second pass of the filter 110 is again decimated and recirculated through the filter for a third pass ($2^{13}$ Ks/sec.). The sequencing of data including the third pass-data is illustrated on time line three of FIG. 9 by the numeral 3. Again more of the unused time slots are occupied. This process of multiplexing the succeeding filter passes can be extended indefinitely. For the $p^{th}$ data pass through the filter, the data from that pass occupies the clock time periods given by the relationship $2^p k + 2^{p-1} - 1$ where $p > 0$ and $2^{pmax}(k+1) - 1$ when $p = 0$ (test data period). Where p represents the number octaves for the incoming data or the number of times the data spectrum is to be divided and k represents the number of times a given set of data in a given clock period has been cycled through the filter 110 or the $k^{th}$ pass per octave and which octave is being processed.

The data sequence employed in the mechanization described by FIG. 9 leads to a larger memory to be multiplexed than a simple FIR filter. Each pass through a delay element of $z^{-1}$, has a single-data-word storage requirement. Therefore, for the multiple passes of data there is now a requirement to store 13 data words, $M_0$ through $M_{12}$. The filter input must be correspondingly multiplexed.

Figure 10:
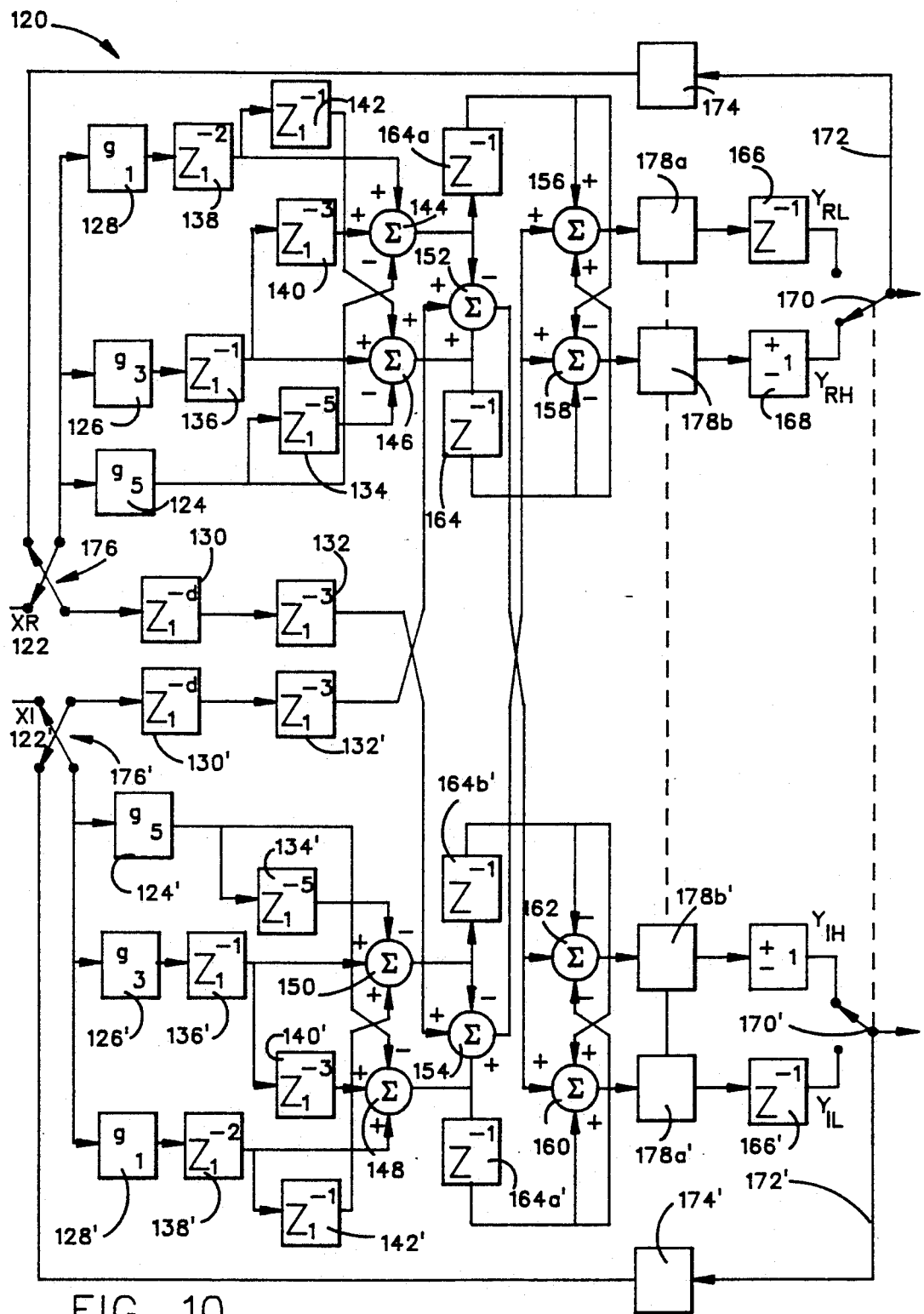
FIG. 10 illustrates a schematic of a preferred embodiment of the bandsplitting filter of FIG. 8 using three multipliers each for the real and imaginary signal paths.

A complete mechanization of a preferred embodiment for the signal selection apparatus of FIG. 2 is illustrated in greater detail in FIG. 10. In FIG. 10, a time multiplexed configuration of a signal selection or extraction apparatus 120 is shown employing three coefficient multipliers in the bandsplitting filter section. The bandsplitting filter is configured to have the same basic structure as illustrated in FIGS. 6 and 8 for the band filter 110, with N set equal to six, k equal to five, and intermediate weighting elements which apply zero value weights being eliminated. This results in the use of three coefficient multipliers in the filter.

The new selection apparatus 120 is divided into an upper portion that principally operates on real data samples and a lower portion that operates on the imaginary data samples, from the complex input data as provided by the Hilbert transformer previously discussed. Also, as previously discussed, the upper and lower portions of the selection apparatus 120 are substantially identical or mirror images because the real and imaginary data undergo the same basic computational processing. Therefore, many of the like parts in the two sections use the same basic numeral designations with the imaginary processing elements differentiated using a prime (') symbol.

FIG. 10 illustrates one embodiment of a half-band digital filter 120 which receives data on two input buses 122 and 122' which correspond to the busses 24 and 26 in FIG. 1 or the multiplexed buses 32a or 32b in FIG. 2. The input bus 122 is used for real data samples and the input bus 122' is used for transferring imaginary data samples. The input signal is sampled at $2^{15}$ Ks/sec, but the filter 120 is required to operate at only one-half of that rate since the even-numbered samples are processed on one input path and the odd-numbered samples on another. The even numbered data samples from the input data bus 122 are transferred to the three coefficient multipliers 124, 126, and 128. At the same time even numbered data samples from the input data bus 122' are transferred to the three coefficient multipliers 124', 126', and 128'. While every other or even-numbered samples, are transferred to the coefficient multipliers and the odd-numbered samples are transferred to a delay element 130 (130'). This is equivalent to applying a unity coefficient multiplication to the odd-numbered samples. The input or transfer of data samples is directed by switching elements 180 and 180', discussed further below.

The delay element 130 is labeled $z^{-d}$ and applies a time period delay of d seconds to the data sample where d is equal to the computational delay that occurs in a multiplier element. For other delay elements in the selection apparatus 120, the length of time for a standard one-unit-delay period is determined from the data sample rate or spacing (T in FIG. 3). Those skilled in the art are familiar with a variety of structures useful in implementing this and the other delay elements discussed below, as well as the multipliers employed in this embodiment.

Looking now only at the upper portion of the filter 120, the data samples are all subjected to a multiplication in the multipliers 124, 126, and 128 by the coefficients $g_5$, $g_3$, and $g_1$, respectively, resulting in the products $g_5 X_R z^{-d}$, $g_3 X_R z^{-d}$, and $g_1 X_R z^{-d}$, where d is the inherent delay imposed by a multiplier. The odd-numbered samples are then transferred from the delay element 130 to the delay element 132, and the even-numbered weighted samples or multiplier products are transferred to the delay elements 134, 136, and 138, respectively.

The nomenclature used in the delay element labels refers to both the intrinsic delay of the operational element and the clocking rate. That is, an element labeled as $z_1^{-1} (= z^{-2})$ generates a two unit time period delay for data. This is accomplished using one of many known techniques and typically involves clocking a data element through two different storage locations or registers, one for each of two clock or timing periods. The subscript n denotes that this element is not constantly operational but is accessed every $n^{th}$ (0, 1, 2... n) time. For example, in delay element 132 the n=1 denotes that data is transferred from the element only every other clock period. Therefore, the intrinsic delay is in effect doubled. However, it is important to note that this increased delay is accomplished with a reduction in memory or other circuitry found in traditional approaches because the data is simply not clocked out versus being transferred or shifted through a series of storage registers or locations. This reduction in storage memory or registers and related elements to achieve the same amount of delay, is very advantageous for reducing power, circuit complexity, and cost. However, those skilled in the art will readily recognize that the present invention can be implemented with multiple stage delay elements where power and complexity are not a limitation within the specific application.

The delay element 132 is labeled as $z_1^{-3}$ which shows that it applies a delay of six time periods, $z^{-6}$, to the sampled data. The cumulative delay for the delay elements 130 and 132 results in a delay of 6 unit plus d time periods so that the output at this node is $X_R z^{-(6+d)}$.

The output of the multiplier 124 is $X_R g_5 z^{-d}$. The $z^{-d}$ factor resulting from the computational delay within the multiplier. This output is transferred both as an input to an adder 144 and an other delay element 134 which is connected in series with the multiplier 124. A delay of $z^{-10}$ is implemented ($z_1^{-5}$) in the delay element 134. The output of the delay element 134 is $X_R g_5 z^{-(10+d)}$ and is applied to one input of a three-input adder 146.

The output of the multiplier 126 is applied directly to a delay element 136 which is connected in series with the multiplier 126. The delay element 136 implements a two time-unit, $z^{-2}$ ($z_1^{-1}$), delay and its output is transferred to both the adder 146 and another delay unit 140 which implements a further delay of six time-units. The output of the delay unit 136 is $X_R g_3 z^{-(2+d)}$ and that of the delay element 140 is $X_R g_3 z^{-(8+d)}$. The output of the multiplier 128 is applied directly to a delay element 13B which is connected in series with the multiplier and implements a four time unit, $z^{-4}$ ($z_1^{-2}$), delay. The output of the delay element 138 is transferred to both the adder 144 and another delay unit 142, which implements a two time-unit delay. The output of the delay unit 138 is $X_R g_1 z^{-(4+d)}$ and that of the delay element 142 is $X_R g_1 z^{-(6+d)}$.

The imaginary data samples undergo parallel processing steps and the filter 120 structure provides an output of $X_I g_5 z^{-d}$ from the multiplier 124', $X_I g_5 z^{-(10+d)}$ from the delay element 134', $X_I g_3 z^{-(2+d)}$ from the delay element 136', $X_I g_3 z^{-(8+d)}$ from the delay element 140', $X_I g_1 z^{-(4+d)}$ from the delay element 138', and $X_I g_1 z^{-(6+d)}$ from the delay element 142'. The outputs from the multiplier 124', delay element 138', and delay element 140' are each applied to one of three inputs for the three-input adder 148. The outputs from the three delay elements 134', 136', and 142' are each applied to one of three inputs for the three-input adder 150.

The adder 144 adds the outputs from the delay elements 138 and 140 and subtracts the output from the multiplier 124. The adder 146 adds the outputs from the delay elements 136 and 142 and subtracts the delay element 134 output. Likewise, the adder 148 adds the outputs from the delay elements 138' and 140' and subtracts the output from the multiplier 124' while the adder 150 adds the outputs from the delay elements 136' and 142' and subtracts the output from the delay element 134'. These operations result in the generation of four composite signals, two for the real data and two for the imaginary data. The adders 144, 146, 148 and 150 generate the outputs:

| Adder | Output | |
|---|---|---|
| 144 | $X_R[g_1 z^{-4} + g_3 z^{-8} - g_5]z^{-(d+1)}$ | (24) |
| 146 | $X_R[g_1 z^{-6} + g_3 z^{-2} - g_5 z^{-10}]z^{-(d+1)}$ | (25) |
| 148 | $X_I[g_1 z^{-4} + g_3 z^{-8} - g_5]z^{-(d+1)}$ | (26) |
| 150 | $X_I[g_1 z^{-6} + g_3 z^{-2} - g_5 z^{-10}]z^{-(d+1)}$ | (27) | where the $z^{-d}$ delay is due to the multiplier and the additional $z^{-1}$ is due to the adder operation.

The outputs from the adders 144 and 146, and delay element 132' are combined in an adder 152 which subtracts the adder 144 output from the sum of the adder 146 and delay element 132' outputs. The outputs from the adders 148 and 150, and delay element 132 are combined in an adder 154 which subtracts the adder 150 output from the sum of the adder 148 and delay element 132 outputs. This provides the outputs:

| Adder | Output | |
|---|---|---|
| 152 | $\{X_R[g_1(z^{-6} - z^{-4}) - g_3(z^{-8} - z^{-2}) - g_5(z^{-10} - 1)] + X_I z^{-5}\} z^{-(d+2)}$ | |
| 154 | $\{X_I[-g_1(z^{-6} - z^{-4}) + g_3(z^{-8} - z^{-2}) + g_5(z^{-10} - 1)] + X_R z^{-5}\} z^{-(d+2)}$ | | or by substituting the relationships of equations 6 and 7 above:

| 152 | $\{X_R B(z) + X_I z^{-5}\} z^{-(d+2)}$ | (28) |
|---|---|---|
| 154 | $\{-X_I B(z) + X_R z^{-5}\} z^{-(d+2)}$ | (29) |

At the same time, the output from the adder 144 is applied through a compensatory time unit delay element 164a as a positive input to an adder 156 and a negative input to an adder 158. The output from the adder 146 is also applied through a compensatory delay 164b as a positive input to the adder 156 and a negative input to the adder 158. In addition, the output from the adder 148 is applied through a compensatory delay 164a' as a positive input to an adder 160 and a negative input to an adder 162. The output from the adder 150 is also applied through a compensatory delay 164b' as a positive input to the adder 160 and a negative input to the adder 162. The output from the adder 152 is applied as positive input to both of the adders 160 and 162. The output from the adder 154 is applied as positive input to both of the adders 156 and 158. The compensatory delay ($z^{-1}$) of the delay elements 164a, 164b, 164a', and 164b' are used to compensate for the inherent delays of the adders 152 through 162 for data timing purposes. The summation operations in these adders provide the outputs:

| Adder | Output |
|---|---|
| 156 | $\{X_I[-g_1(z^{-6} - z^{-4}) + g_3(z^{-8} - z^{-2}) + g_5(z^{-10} - 1)] + X_R z^{-5} + X_R[g_1 z^{-4} + g_3 z^{-8} - g_5] + X_R[g_1 z^{-6} + g_3 z^{-2} - g_5 z^{-10}]\} z^{-(d+3)}$ |
| 158 | $\{X_I[-g_1(z^{-6} - z^{-4}) + g_3(z^{-8} - z^{-2}) + g_5(z^{-10} - 1)] + X_R z^{-5} - X_R[g_1 z^{-4} + g_3 z^{-8} - g_5] - X_R[g_1 z^{-6} + g_3 z^{-2} - g_5 z^{-10}]\} z^{-(d+3)}$ |
| 160 | $\{X_R[g_1(z^{-6} - z^{-4}) - g_3(z^{-8} - z^{-2}) - g_5(z^{-10} - 1)] + X_I z^{-5} + X_I[g_1 z^{-4} + g_3 z^{-8} - g_5] + X_I[g_1 z^{-6} + g_3 z^{-2} - g_5 z^{-10}]\} z^{-(d+3)}$ |
| 162 | $\{X_R[g_1(z^{-6} - z^{-4}) - g_3(z^{-8} - z^{-2}) - g_5(z^{-10} - 1)] + X_I z^{-5} - X_I[g_1 z^{-4} + g_3 z^{-8} - g_5] - X_I[g_1 z^{-6} + g_3 z^{-2} - g_5 z^{-10}]\} z^{-(d+3)}$ |
| OR | |
| 156 | $-X_I B(z) + X_R z^{-5} + X_R A(z)$ (30) |
| 158 | $-X_I B(z) + X_R z^{-5} - X_R A(z)$ (31) |
| 160 | $X_R B(z) + X_I z^{-5} + X_I A(z)$ (32) |
| 162 | $X_R B(z) + X_I z^{-5} - X_I A(z)$ (33) | resulting in the output coefficients for $Y_{RL}$, $Y_{IL}$, $Y_{RH}$, and $Y_{IH}$ shown in equations 8-15 above, where the common delay factor $z^{-(d+3)}$ has been dropped in the later expressions. This delay is acounted for in compensatory delay elements discussed below.

At this point, the alternate data samples in the high or upper half-band $Y_{RH}$ and $Y_{IH}$ signals require complementing. This is accomplished by transferring these signals from the adders 158 and 162 through the alternating complementary elements or multipliers 168 and 168'. In the elements 168 and 168', every other data sample is complemented, hence the ±1 designation for the elements 168 and 168'. An exemplary element 168 is a multiplier configured to multiply alternating data samples by 1 and every other data sample by −1. Again, to compensate for inherent element processing delays, compensatory delay elements 166 and 166' are placed in series with the adder 156 and 160 outputs ($Y_{RL}$, $Y_{IL}$) to counter the delay effects of the complementory elements.

In FIG. 10, the bandwidth-reduced data is output through the two selection switches 170 and 170' to the two data buses 172 and 172'. The position of the selection switches 170 and 170' determines whether an upper or lower half-band is chosen for the bandsplitting filter output. To accomplish the data recirculation in combination with the input data, the output data is decimated and repetitively transferred or recirculated through the filter 120. This is easily done by transferring the data along the buses 172 and 172' to feedback buffers, or temporary memory devices 174 and 174' where the data is stored temporarily while new data is being introduced into the filter 120. That is, every other clock cycle, data is introduced into the filter 120 and every other clock cycle data is recirculated into the filter from the output.

In order to accommodate the even/odd data sampling previously discussed, the switching elements or multiplexing devices 176 and 176' are used to switch the source of data for the even and odd input portions of the bandsplitting filter. The switching elements 176 and 176' are clocked to shift their input states between the input data buses 122, 122' (32a) and the recirculating data buses 172, 172' (32b). Switches 176 and 176' are performing the operation illustrated for switches 34 and 38 in FIG. 2. Therefore, when the even data input is receiving new data the odd data input point is receiving recirculated data and visa versa. This technique very efficiently multiplexes the ever lower data transfer rates or bandwidth-reduced data for the half-band filtering process. This maximizes the use of the half-band filter 120 circuitry while decreasing the overall complexity and, thus, cost and power required for signal extraction. An exemplary element for the elements 176 and 176' would be an electronic switching element of the two-pole two-throw type. Preferably, the two switching elements are part of a "ganged" or commonly controlled element.

The states of the switches 176, 176', 170, and 170' are generally controlled as part of the basic timing control exercised over the bandsplitting filter from the control element 36, previously discussed. An exemplary control element would be a small microprocessor element with a small amount of memory for storing preconfigured command functions for the operation of the bandsplitting filter. The microprocessor could be reconfigured before data processing to select the number of recirculation steps required, the specific frequency or channel desired, and some gain parameters.

Returning for a moment to FIG. 10, the worst case gain through the first composite adder stage (144, 146, 148, 150) of the filter 120 is $g_5 + g_3 + g_1$ or about 0.527306108. When extended through the next adder stage (152, 154), this becomes 2.054612216, and in the final adders (156, 158, 160, 162) about 3.109224432. If $L_1$ gain scaling is applied, the signal would have to have a scale reduction to prevent exceeding unity at any critical point. For a fixed-point mechanization and a full-scale worst-case input, performing a 2-place right shift in either of the early adder stages, to prevent problems is safe. Unfortunately, this scaling tends to reduce the dynamic range of the signal of interest. A more useful approach for scaling is the use of $L_\infty$ scaling. Here, for a full-scale input to the half-band filter 120, the passband gain is set to a value of between about 2 and 1, dependent upon the signal to noise ratio for the input. The unadjusted gain of the filter at the passband filter is then about 2.000336182. A preferable approach for most processing appears to be extended precision arithmetic in the final adder stages (152-162). The output of the adders 156, 158, 160, 162 is rounded to 18 bit precision and selective right shifting is applied to the rounding one or two places at the adder outputs. This is necessary because of the potential 2-bit word length growth as the signal progresses through the filter at each iteration.

In FIG. 10, gain control is provided by, a series of 1- or 2-bit shifters 178a, 178b, 178a', and 178b' which are connected in series with the $Y_{RL}$, $Y_{RH}$, $Y_{IH}$, and $Y_{IL}$ outputs. This allows a 1 or 2 bit shift of the output values to alter the gain level as desired. The gain can typically be adjusted on the order of ±122 dB in about 6 dB steps. It is readily apparent that other shifting schemes can be employed where desired.

Figure 11A:
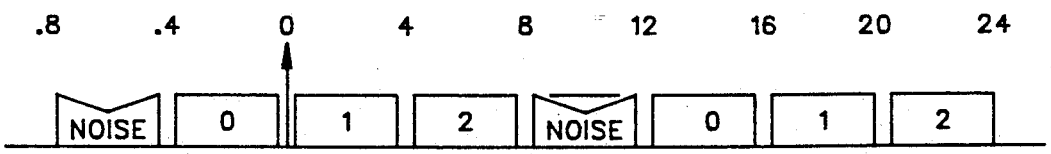
FIG. 11 illustrates exemplary frequency spectra and filter frequency responses of the apparatus of FIG. 10.
Figure 11B:
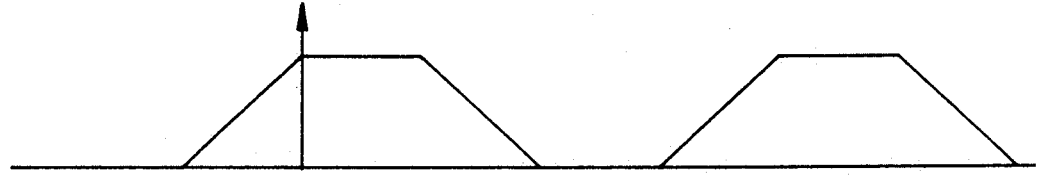

The output from the band-splitting filter portion of the selection apparatus 120 does not typically provide a signal exhibiting the proper noise filtering characteristics. An exemplary spectrum of the data signal at the input to the last, twelfth, half-band filter pass is shown in FIG. 11a. For example, assuming that a lower half-band signal channel "1" is to be selected. The frequency response of the last half-band filtering step is shown in FIG. 11b and the resulting spectrum of the last output cycle is shown in FIG. 11c.

Figure 11C:
Figure 11D:

The output shown in FIG. 11c shows that while the desired channel 1 signal has been preserved and noise eliminated, the adjacent channels "0" and "2" are only attenuated but not eliminated. After the signal is decimated, the output results in the signal shown in FIG. 11d. Here the channel 1, selected, signal is still preserved but the previously attenuated adjacent channels, 0 and 2, are now added together or aliased to produce a new high level noise.

Figure 11E:
Figure 11F:

This latter noise can be eliminated through application of a noise filter stage to the output of the bandsplitting filter 120 (40). If a noise filter stage is applied having the frequency response illustrated in FIG. 11e, the output from that stage would appear like the signal shown in FIG. 11f. At this point the desired channel has been selected and unwanted channels and noise rejected or severely attenuated.

In the example being used, the signal channels are 3.4 kHz wide with 4 kHz spacing which provides for a transition band of 600 kHz. This provides a normalized transition band of 600/8000=0.075. If a 50 dB stopband attenuation is desired, a single sided noise filter designed using a Kaiser-Bessel window would have 20 taps (N=0 to 19). Continuing to use a half-band filter means that half of the filter coefficients are still zero for a symmetrical filter.

If a half-band lowpass noise filter is used, then the filter is again described by the transfer function of equation 2, above. and the coefficients $g_k$ are defined by the relationship of equation 3. To perform complex filtering the frequency response of the noise filter must be shifted by $\omega_o = \omega_s/4$. Therefore, b the filter coefficients need to be multiplied by $e^{jk\omega_o T} = e^{j\pi k/2}$ which forms the complex transfer function:

$$G_c(z) = \sum_{k=-N}^{N} (g_k e^{jk\omega_0 T}) z^{-k}$$

$$= w_0 + j2/\pi \sum_{k=-N}^{N} [1 - (-1)^k] w_k z^{-k}/k$$

$$= G_R(z) + jG_I(z)$$

and:

$G_R(z) = w_0$ (set $w_0 = 1$)

where $$G_I(z) = \sum_{k=-N}^{N} g_{kI} z^{-k}$$

$$g_{kI} = \begin{cases} 2w_k/\pi k & \text{odd } k \\ 0 & \text{even } k \end{cases}$$

The noise filter output Y is then given by the relationships of equations 7 through 9. Since $G_R(\omega) = 1$, the coefficients $D_k$ for the filter stages are given by the relationship:

$$D_k = |g_{kI}|$$

Figure 12:
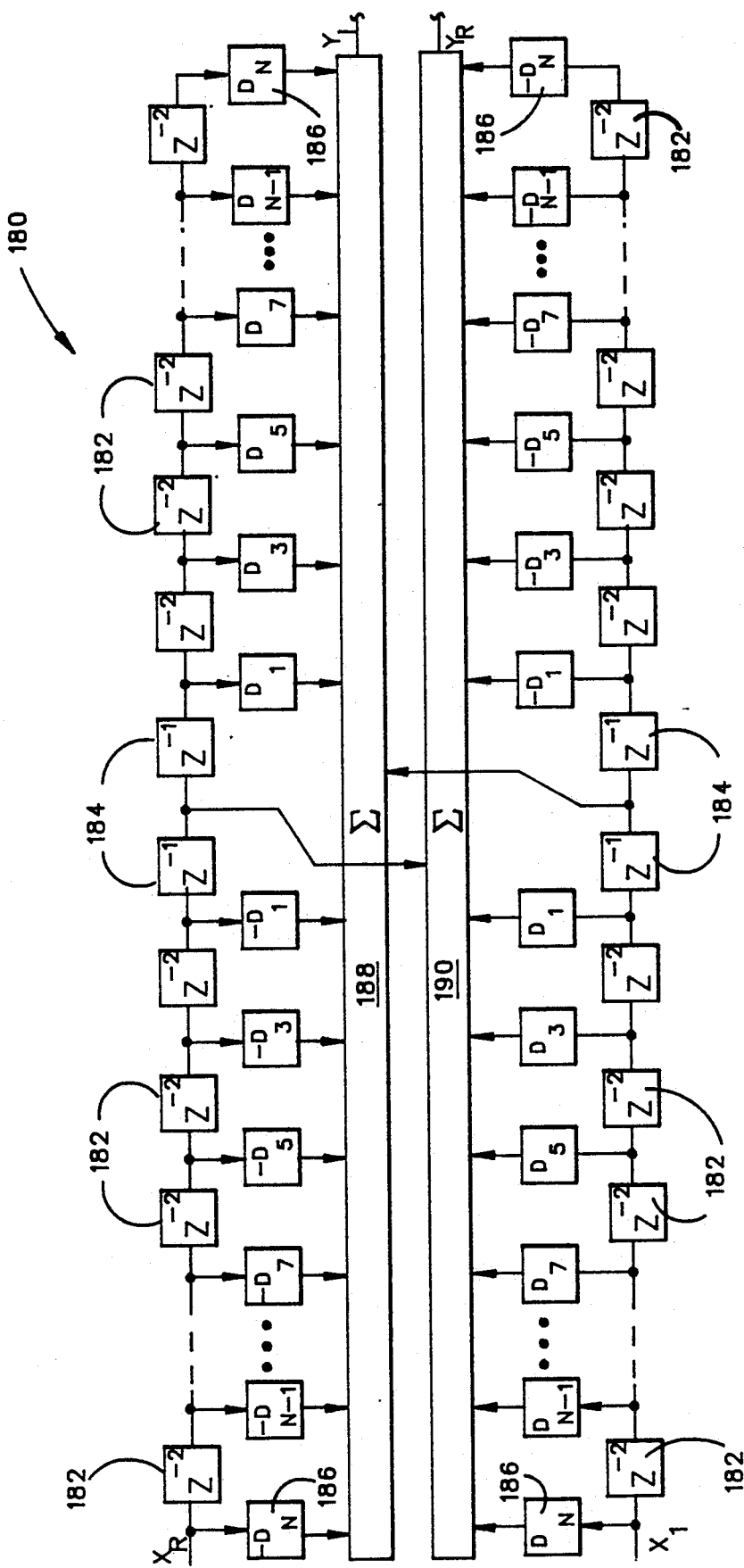
FIG. 12 illustrates a schematic of a preferred embodiment for a complex low pass noise-removal filter useful for the present invention in post filtering the circuit of FIG. 10.

Applying these relationships to the ideal filter shown in FIG. 3 provides a modification which leads to the mechanization of a noise filter as shown in FIG. 12. In FIG. 12,. a schematic overview is illustrated for a noise filter 180. The noise filter 180 employs delay elements 182 and 184 dispersed between the multipliers 186 on the real data side and the delay elements 182' and 184' and multipliers 186' on the imaginary data side. The multipliers 186 and 186' are used to implement the coefficients $D_k$. For the present example with N=20 (0 to 19) the coefficients $D_k$ are listed in Table III.

TABLE III

| Coeff. | Value |
|---|---|
| D1 | 0.62553948 |
| D3 | 0.18118908 |
| D5 | 0.08208811 |
| D7 | 0.03847226 |
| D9 | 0.01706070 |
| D11 | 0.00691574 |
| D13 | 0.00251930 |
| D15 | 0.00081681 |
| D17 | 0.00023429 |
| D19 | 0.00005922 |

The output from the coefficient multipliers 196 are combined in a summation element or adder 188 to form a composite imaginary output signal $Y_I$. The output from the coefficient multipliers 196 are combined in a summation element or adder 190 to form a composite real data output signal $Y_R$. The noise figure for the present filter and noise filter circuit is estimated at about 80 dB.

Although the even-odd sampling method previously discussed could be used to mechanize this noise filter, it may be advantageous to maintain a higher sampling rate to simplify subsequent processing. Therefore, the even-odd sampling method is generally not employed for this stage of processing. A total number of 40 real multiplications occur for each sample period which results in 160,00 multiplications per second at 4 kHz. One time shared multiplier working with two 40-word by 16-bit storage units or RAM, and two accumulators can perform this function.

As shown in FIG. 10 there are three compensating delays on each side of the adders 156, 158, 160, and 162. There are 11 words stored in the feedback buffer (one per recursive pass) and 15 words per forward data pass (here 12) for a total of (3+11+12X15) X2=388 RAM memory locations for the frequency-splitting filters. For 16-bit arithmetic and six transistors for each RAM storage cell, then 388×16 bits, 6208, of storage are required for about 37,248 transistors. The circuit uses six modified-Booth multipliers. Using 16-bit data and 16-bit coefficients, each multiplier uses about 8,000 transistors, for a total of 48,000 transistors for implementing multiplication. With an overhead of about 10 percent for basic control and synchronization functions and some interconnection control, the frequency splitting filter of FIG. 10 requires about 107,000 transistors.

The noise filter stage requires an additional 44 storage locations for the input data and 2 for the accumulators, and these RAM locations at 16 bits each require about 4416 transistors. An additional 6-word by 16-bit storage for coefficients is required, for 96 transistors, along with 8800 multiplier accumulator transistors and 192 output buffer transistors. When combined with a 10 percent overhead, the total noise-filter transistor count is about 15,000. Therefore, the entire circuit uses around 123,000 transistors, which is well within the current technology for integrated circuit die or components. The throughput and/or frequency of operation are dependent upon such factors as transistor channel lengths and line sizes. These in turn depend in part on materials and processes. Therefore, the present invention is capable of being reduced at other frequencies etc. depending upon the choices for these materials and processes.

A self contained frequency selector can be integrated into a single integrated circuit package. Typically the device would be manufactured in silicon on a sapphire substrate using 2 μm CMOS/SOS or better technology. A preliminary design called for a 123,000 transistor device fabricated on bulk silicon using 1.2 μm design rules.

The invention provides an extremely low complexity highly efficient and economic method and apparatus for selecting one-of-many channels. The invention has direct application to a variety of applications especially in the area of satellite communications. It would require a 38,000$^{th}$ order FIR filter to provide the level of response acquired by the invention. The technique employed is adaptable to many signal-processing requirements. The ease of mechanizing this filter function allows application to other problems.

The device is easily tuned with a 12-bit command word, and capable of operating in parallel with like devices to select any number of channels (arbitrarily) as desired. As shown in FIG. 2, each filter section employs at least three control lines. One control line selects between the upper and lower half-band output, one control lines selects between automatic or manual gain control, and the third line controls filter gain. Therefore, each filter generally uses a 12-bit control to select the frequency of interest and a 5-bit control signal to select the gain. A 5-bit gain control signal accommodates twenty-five gain states, which is found to be adequate for most applications.

The foregoing description of preferred embodiments has been presented for purposes of illustration and description. It is not intended to be exhaustive nor to limit the invention to the precise forms disclosed, and many modifications and variations are possible in light of the above teaching. The embodiments were chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What I claim as my invention is:

1. A method of extracting a predetermined single signal from a group of frequency division multiplexed signals, comprising the steps of:
    receiving frequency division multiplexed Hilbert transformed signals in a known spectral band at a known sampling rate;
    splitting said received frequency division multiplexed signals into upper and lower frequency spectrum half-bands;
    complex frequency shifting the upper frequency half-band signals into said lower half-band;
    selecting one of said upper and lower half-band signals whichever one contains said predetermined single signal; and
    recirculating said selected half-band signals into said splitting step, selecting one half of the portion of said selected half-band recirculated which contains the predetermined single signal, and continuing said selecting, recirculating and splitting steps until said single signal is obtained.

2. The method of claim 1 wherein said step of recirculation comprises interleaving the recirculated signals after each selection step with signals from previous selection steps.

3. The method of claim 2 wherein said recirculation step comprises transferring said selected signal into a transient memory device and then clocking said selected signal for splitting from said memory device in time relationship to other input signals.

4. The method of claim 2 wherein said recirculation step comprises decimating said selected signals by transferring only every other signal within said selected half-band signals at one-half of the immediately preceding signal sample rate.

5. The method of claim 1 wherein said splitting step comprises the step of applying said received and recirculated signals to a bandsplitting filter having N+1 filter taps, where N is determined by a desired noise isolation level.

6. The method of claim 5 wherein said step of splitting into half-bands comprises the steps of:
    separating said signals into real signal samples and imaginary signal samples;
    filtering each of said real and imaginary signal samples in a tapped delay line filter, using the steps of:
    applying said signal samples to a filter center tap;
    delaying signal samples output by said center tap a preselected time delay of N unit-time periods;
    applying said signal samples to first and second pluralities of k filter taps, where $1 \leq k \leq n$, positioned on opposite sides of said center tap;
    delaying each signal sample by a factor of N+k unit-time periods in reaching each $k^{th}$ filter tap position in said first plurality of k filter taps;
    delaying each signal sample by a factor of N−k unit time periods in reach each $k^{th}$ filter tap position in said second plurality of k filter taps;
    summing the output of said first and second plurality of k filter taps to form a first composite signal;
    taking the difference of each $k^{th}$ tap in said first and second plurality of k filter taps and summing the results to form a second composite signal;
    whereby first and second composite real, first and second composite imaginary, and delayed center tap real and imaginary signals are formed;
    summing said first composite and delayed center tap real signals, and subtracting said second composite imaginary signal to provide a real low half-band signal $Y_{RL}$;
    summing said first composite and delayed center tap imaginary signals with said second composite real signal to provide an imaginary low half-band signal $Y_{IL}$;
    subtracting said first composite real and second composite imaginary signals from said delayed center tap signal to provide a real high half-band signal $Y_{RH}$; and subtracting said first composite imaginary signal from the sum of said delayed center tap imaginary and second composite real signals to provide an imaginary high half-band signal $Y_{IH}$.

7. The method of claim 5 wherein said step of splitting the input signals into half-bands comprises the steps of:

separating said signal samples into real signal samples and imaginary signal samples;

filtering each of said real and imaginary signal samples using the steps of:

applying a weighting coefficient $g_o$ to signal samples;

implementing a preselected time delay on said $g_o$ weighted data of N unit-time periods;

applying a plurality of predetermined weighting coefficients $g_k$ to said signal samples, where the value of k is an integer greater than zero and less than or equal to N;

implementing second and third delays of N−k and N+k unit-time periods, respectively, in parallel on each of said $g_k$ weighted signal samples;

summing each $k^{th}$ second and third delayed weighted signal samples to form a plurality of k weighted sums;

applying a sign factor adjustment to each of said k weighted sums which equals minus one raised to the power of the absolute value of k divided by four and rounded to the nearest lower integer value;

summing all of said adjusted weighted sums to form a first composite signal;

taking the difference of each kth second and third delayed weight signal samples to form k weighted differences;

applying a sign factor adjustment to each of said k weighted differences, which equals minus one raised to the power of the absolute value of k divided by four plus two and rounded to the nearest lower integer value;

summing all of said adjusted weighted differences to form a second composite signal;

whereby first and second composite real and first and second composite imaginary, and real and imaginary delayed $g_o$ weighted signals are created;

summing said first composite and delayed $g_o$ weighted real signals, and subtracting said second composite imaginary signal therefrom to provide a real low half-band signal $Y_{RL}$;

summing said first composite and delayed $g_o$ weighted imaginary signals with said second composite real signal to provide an imaginary low half-band signal $Y_{IL}$;

subtracting said first composite real and second composite imaginary signals from said delayed $g_o$ weighted real signal to provide a real high half-band signal $Y_{RH}$; and subtracting said first composite imaginary signal from the sum of said delayed $g_o$ weighted imaginary and second composite real signals to provide an imaginary high half-band signal $Y_{IH}$.

8. The method of claim 7 wherein said step of complex shifting comprises the step of multiplying said signals $Y_{RH}$ and $Y_{IH}$ by a factor of $e^{-jk\pi 2}$, where k is the sample number.

9. The method of claim 7 wherein said recirculation step comprises the step of decimating the $Y_{RL}$, $Y_{IL}$, $Y_{RH}$, and $Y_{IH}$ signals by a factor of two and transferring at one-half of the immediately preceding signal sample rate.

10. The method of claim 9 wherein said step of decimating further comprises the steps of:

applying said $g_o$ weighting coefficient to all odd numbered signal samples; and applying said $g_k$ weighting coefficients all even numbered signal samples.

11. The method of claim 9 further comprising transferring selected decimated $Y_{RL}$, $R_{IL}$, $Y_{RH}$, and $Y_{IH}$ signals into a transient memory device and then clocking said signals into said bandsplitting filter from said memory device in timed relationship to other input signals.

12. The method of claim 7 wherein said weighting factors are equal to zero for k equal to even integers.

13. The method of claim 5 wherein said step of splitting into half-bands comprises the steps of:

separating said signal samples into real and imaginary signal samples;

filtering each of said real and imaginary signal samples using the steps of:

applying a weighting coefficient $g_o$ to signal samples;

implementing a preselected time delay on said $g_o$ weighted data of N unit-time periods;

applying a plurality of predetermined weighting coefficients $g_k$ to said signal samples, where k is an integer greater than zero and equal to or less than N;

implementing a second delay of N−k unit-time periods on said $g_k$ weighted signal samples;

implementing a third delay of 2k unit-time periods in series with said first delay on said $g_k$ weighted signal samples;

summing each $k^{th}$ second and third delayed weighted signal samples;

applying a sign factor adjustment to each of said k weighted sums which equals minus one raised to the power of the absolute value of k divided by four and rounded to the nearest lower integer value;

summing all of said adjusted weighted sums to form a first composite signal;

taking the difference of each $k^{th}$ second and third delayed weighted signal samples to form k weighted differences;

applying a sign factor adjustment to each of said k weighted differences, which equals minus one raised to the power of the absolute value of k divided by four plus two and rounded to the nearest lower integer value;

summing all of said adjusted weighted differences to form a second composite signal;

whereby first and second composite real, and first and second composite imaginary, and rear and imaginary delayed $g_o$ weighted signals are created;

summing said first composite and delayed $g_o$ weighted real signals, and subtracting said second composite imaginary signal therefrom to provide a real low half-band signal $Y_{RL}$;

subtracting said first composite real and second composite imaginary signals from said delayed $g_o$ weighted real signal to provide a real high half-band signal $Y_{RH}$; and subtracting said first composite imaginary signal from the sum of said delayed $g_o$ weighted imaginary and second composite real signals to provide an imaginary high half-band signal $Y_{IH}$.

14. The method of claim 5 wherein said step of splitting the input signals into half-bands comprises the steps of:
separating said signal samples into real and imaginary signal samples;
implementing a first preselected time delay on said real signal samples and on said imaginary signal samples of d unit-time periods, where d is determined from the minimum time it takes to apply a weighting coefficient to the signal samples;
applying a second delay of 6 unit time periods to said first delayed real and imaginary signal samples;
applying at least three predetermined weighting coefficients $g_1$, $g_2$, and $g_3$ in parallel to said real and imaginary signal samples;
applying a third delay of 10 unit-time periods in series on said $g_1$ weighted real and imaginary signal samples;
applying a fourth delay of 2 unit-time periods in series on said $g_2$ weighted real and imaginary signal samples;
applying a fifth delay of 6 unit-time periods in series on said $g_2$ weighted real and imaginary signal samples;
applying a sixth delay of 4 unit-time periods in series on said $g_3$ weighted real and imaginary signal samples;
applying a seventh delay of 2 unit-time periods in series on said $g_3$ weighted real and imaginary signal samples;
summing said fifth and sixth delayed real signal samples and subtracting said $g_1$ weighted signal samples to form a first real composite signal;
summing said fourth and seventh delayed real signal samples and subtracting said third delayed real signal samples to form a second real composite signal;
summing said fifth and sixth delayed imaginary signal samples and subtracting said $g_1$ weighted imaginary signal samples to form a first imaginary composite signal;
summing said fourth and sixth delayed imaginary signal samples and subtracting said third delayed imaginary signal samples to form a second imaginary composite signal;
summing said second real composite signal and said second delayed imaginary signal and subtracting said first real composite signal therefrom to form a third real composite signal;
summing said second imaginary composite signal and said second delayed imaginary real signal samples and subtracting said first imaginary composite signal therefrom to form a third imaginary composite signal;
summing said first composite real, second composite real and third composite imaginary signals to provide a real low half-band signal $Y_{RL}$;
summing said first composite imaginary, second composite imaginary and third composite real signals to provide a low half-band signal $Y_{RL}$;
subtracting said first and second composite real signals from said third composite real signal to provide an imaginary high half-band signal $Y_{IH}$; and
multiplying said YRH and RIH signals by a factor of $e^{-jk\pi 2}$.

15. The method of claim 14 wherein said recirculation step comprises the steps of:
transferring said $Y_{RL}$, $Y_{IL}$, $Y_{RH}$, and $Y_{IH}$ signal at one-half of the immediately preceding signal sample rate;
applying said $g_o$ weighting coefficient to all odd numbered input and recirculated signal samples; and
applying said $g_k$ weighting coefficient to all even numbered input and recirculated signal samples.

16. An apparatus for extracting a predetermined single signal from a group of frequency division multiplexed signals, comprising:
input means for receiving frequency division multiplexed Hilbert transformed signals in a known spectral band at a known signal data sampling rate;
bandsplitting means for splitting said received frequency division multiplexed signals into upper and lower frequency spectrum half-bands;
shifting means for complex frequency shifting the upper frequency half-band signals into said low frequency half-band;
selection means for selecting one of said upper and lower half-band signals whichever one contains said predetermined single signal; and
recirculation means for recirculating data samples within said selected half-band signals into said bandsplitting means with said selection means selecting one-half of the portion of said selected half-band recirculated which contains the predetermined single signal, and continuing the selecting, recirculating and splitting until said single signal is obtained.

17. The apparatus of claim 16 wherein said recirculation means comprises timing means for interleaving recirculated signal data output samples from said selection means with input signal data.

18. The apparatus of claim 17 wherein said recirculation means further comprises transient memory means connected between an apparatus output and said input means for receiving, storing, and clocking said selected signal data from the output into said bandsplitting means in timed relationship to other input signal data samples.

19. The method of claim 16 wherein said recirculation means comprises decimation means connected in series with said bandsplitting means for transferring only every other output data sample to said selection means at one-half of the immediately preceding data sample rate.

20. The apparatus of claim 16 wherein said bandsplitting means comprises N+1 filter taps, where N is determined by a desired noise isolation level.

21. The apparatus of claim 20 wherein said bandsplitting means comprises:
separation means for separating said data samples into real data samples and imaginary data samples;
first and second tapped line filter means for filtering said real data samples and imaginary data samples, respectively, each comprising:
a center filter tap;
first delay means connected to said center tap for applying a preselected time delay of N unit-time periods;
first and second pluralities of k filter taps, where $1 < k < N$, positioned on opposite sides of said center tap;
second delay means connected to each of said first k filter taps for delaying each data sample by a factor of N−k unit-time periods in reaching each kth filter tap position in said first plurality of k filter taps;

third delay means connected to each of said second k filter taps for delaying each data sample by a factor of N+k unit-time periods in reaching each kth filter tap position in said second plurality of k filter taps;

first summation means connected to said pluralities of filter taps for summing the output of said first and second plurality of k filter taps to form a first composite signal;

second summation means connected to said pluralities of filter taps for taking the difference of each $k^{th}$ tap in said first and second plurality of k filter taps and summing the results to form a second composite signal;

whereby first and second composite real, and first and second composite imaginary signals are created;

third summation means connected to said first real summation, second imaginary summation, and first real delay means for summing said first composite real and delayed center tap signals, and subtracting said second composite imaginary signal to provide a real low half-band signal $Y_{RL}$;

fourth summation means connected to said first imaginary summation, second real summation, and first imaginary delay means for summing said first composite imaginary and delayed center tap signals with said second composite real signal to provide an imaginary low half-band signal $Y_{IL}$;

fifth summation means connected to said first real summation, second imaginary summation, and first real delay means for subtracting said first composite real and second composite imaginary signals from said delayed center tap signal to provide a real high half-band signal $Y_{RH}$; and sixth summation means connected to said first imaginary summation, second real summation, and first imaginary delay means for subtracting said first composite imaginary signal from the sum of said delayed central tap imaginary and second composite real signals to provide an imaginary high half-band signal $Y_{IH}$.

22. The apparatus of claim 20 wherein said bandsplitting means comprises:

input means for receiving and separating said data samples into a real data sample sequence and an imaginary data sample sequence;

first and second filter means connected to said input means for filtering said real data samples and imaginary data samples, respectively, each comprising:

first weighting means for applying a weighting coefficient $g_o$ to data samples;

first delay means for implementing a preselected time delay on said $g_o$ weighted data of N unit-time periods;

a plurality of k second weighting means each for applying a predetermined weighting coefficient $g_k$ to said data samples, where k is an integer greater than zero and equal to or less than N;

a plurality of k second delay means for implementing a second delay of N−k unit-time periods on said $g_k$ weighted data samples;

a plurality of k third delay means for implementing a third delay of N+k unit-time periods in parallel on said $g_k$ weighted data samples;

first summation means for summing each $k^{th}$ second and third delayed weighted data samples to form a plurality of k weighted sums;

sign allocation means for adjusting the sign of each of said k weighted sums by a sign factor equal to minus one raised to the power of the absolute value of k divided by four and rounded to the nearest lower integer value power;

second summation means for summing all of said adjusted weighted sums to form a first composite signal;

third summation means for taking the difference of each $k^{th}$ second and third delayed weighted data samples to form k weighted differences;

second sign allocation means for adjusting the sign of each of said k weighted differences by a sign factor which equal to minus one raised to the power of the absolute value of k divided by four plus two rounded to the nearest lower integer value power;

fourth summation means for summing all of said adjusted weighted differences to form a second composite signal;

whereby first and second composite real and first and second composite imaginary signals are created;

fifth summation means connected to said second real summation, fourth imaginary summation, and first real delay means for summing said first composite and delayed $g_o$ weighted real signals, and subtracting said second composite imaginary signal to provide a real low half-band signal $Y_{RL}$;

sixth summation means connected to said second imaginary summation, fourth real summation, and first imaginary delay means for summing said first composite and delayed $g_o$ weighted imaginary signals with said second composite real signal to provide an imaginary low half-band signal $Y_{IL}$;

seventh summation means connected to said second real summation, fourth imaginary summation, and first real delay means for subtracting said first composite real and second composite imaginary signals from said delayed $g_o$ weighted real signal to provide a real high half-band signal $Y_{RH}$; and eighth summation means connected to said second imaginary summation, fourth real summation, and first imaginary delay means for subtracting said first composite imaginary signal from the sum of said delayed $g_o$ weighted imaginary and second composite real signals to provide an imaginary high half-band signal $Y_{IH}$.

23. The apparatus of claim 22 wherein said complex shifting means is configured to multiply said signal $Y_{RH}$ and signal $Y_{TH}$ by a factor of $e^{-jk\pi/2}$, wherein k is the sample number.

24. The apparatus of claim 23 wherein said weighting factors are set equal to zero for k equal to even integers.

25. The apparatus of claim 22 wherein said recirculation means comprises decimation means for decimating said $Y_{RL}$, $Y_{IL}$, $Y_{RH}$ and $Y_{IH}$ signals by a factor of two and transferring at one-half of the immediately preceding data sample rate.

26. The apparatus of claim 25 wherein said decimation means comprises:

input means for selecting between even and odd input data samples; and first selection means positioned in series with said input means for selectively transferring even numbered data samples to said weighting means and odd numbered samples to said first delay element.

27. The apparatus of claim 22 wherein said recirculation means further comprises transient memory means connected to received selected decimated $Y_{RL}$, $Y_{IL}$, $Y_{RH}$, and $Y_{IH}$ signal data for storing and clocking said data into said bandsplitting means in timed relationship to other input signal data.

28. The apparatus of claim 22 wherein said first delay elements comprised first and second delay sub-elements and said first delay sub-element implements a one-unit-time delay which is predetermined by the number of clock periods a multiplier requires to form a product and said second delay sub-element implements an N−1 unit-time delay.

29. The apparatus of claim 20 wherein said bandsplitting means comprises:
input means for receiving and separating said data samples into a real data sample sequence and an imaginary data sample sequence;
first and second filter means connected to said input means for filtering said real data samples and imaginary data samples, respectively, each comprising:
first weighting means for applying a weighting coefficient $g_o$ to data samples;
first delay means for implementing a preselected delay on said $g_o$ weighted data of N unit-time periods;
a plurality of k weighting means each for applying a predetermined weighting coefficient $g_k$ to said data samples, where k is an integer greater than zero and equal to or less than N;
a plurality of k second delay means for implementing a second delay of N−k unit-time periods on said $g_k$ weighted data samples;
a plurality of k third delay means for implementing a third delay of 2k unit-time periods on said $g_k$ weighted data samples in series with said second delay means;
first summation means for summing each $k^{th}$ second and third delayed weighted data samples to form a plurality of k weighted sums;
sign allocation means for adjusting the sign of each of said k weighted sums by a sign factor equal to minus one raised to the power of the absolute value of k divided by four and rounded to the nearest lower integer value power;
second summation means for summing all of said adjusted weighted sums to form a first composite signal;
third summation means for taking the difference of each $k^{th}$ second and third delayed weighted data samples to form k weighted differences;
second sign allocation means for adjusting the sign of each of said k weighted differences by a sign factor which equal to minus one raised to the power of the absolute value of k divided by four plus two and rounded to the nearest lower integer value power;
fourth summation means for summing all of said adjusted weighted differences to form a second composite signal;
whereby first and second composite real and first and second composite imaginary signals are created;
fifth summation means connected to said second real summation, fourth imaginary summation, and first real delay means for summing said first composite and delayed $g_o$ weighted real signals, and subtracting said second composite imaginary signal to provide a real low half-band signal $Y_{RL}$;
sixth summation means connected to said second imaginary summation, fourth real summation, and first imaginary delay means for summing said first composite and delayed $g_o$ weighted imaginary signals with said second composite real signal to provide an imaginary low half-band signal $Y_{IL}$;
seventh summation means connected to said second real summation, fourth imaginary summation, and first real delay means for subtracting said first composite real and second composite imaginary signals from said delayed $g_o$ weighted real signal to provide a real high half-band signal $Y_{RH}$; and
eighth summation means connected to said second imaginary summation, fourth real summation, and first imaginary delay means for subtracting said first composite imaginary signal from the sum of said delayed $g_o$ weighted imaginary and second composite real signals to provide an imaginary high half-band signal $Y_{IH}$.

30. The apparatus of claim 29 wherein said complex shifting means is configured to multiply said $Y_{RH}$ and $Y_{IH}$ signals by a factor of $e^{-jk\pi/2}$.

31. The apparatus of claim 20 wherein said bandsplitting means comprises:
input means for receiving and separating said data samples into a real data sample sequence and an imaginary data sample sequence;
first delay means for implementing a preselected time delay on said real and imaginary data of d unit-time periods, where d is determined from the minimum time it takes to apply a weighting coefficient to data;
second delay means for connected to said first delay means for implementing a time delay of 6 unit-time periods on said first delayed real and imaginary data samples;
at least two each, first, second, and third, weighting means connected to said input means each for applying a predetermined weighting coefficient $g_1$, $g_2$, and $g_3$, respectively, in parallel to real and imaginary data samples;
third delay means connected in series with said first weighting means for implementing a third delay of 10 unit-time periods on said $g_1$ weighted real and imaginary data samples;
fourth delay means connected in series with said second weighting means for implementing a fourth delay of 2 unit-time periods on said $g_2$ weighted real and imaginary data samples;
fifth delay means connected in series with said third delay means for implementing a fifth delay of 6 unit-time periods on said $g_2$ weighted real and imaginary data samples;
sixth delay means connected in series with said third weighting means for implementing a fifth delay of 4 unit-time periods on said $g_3$ weighted real and imaginary data samples;
seventh delay means connected in series with said sixth delay means for implementing a fifth delay of 6 unit-time periods on said $g_3$ weighted real and imaginary data samples;
first summation means connected to said first weighting, fifth delay, and sixth delay means for real data for summing said fifth and sixth delayed real data and subtracting said $g_1$ weighted real data samples to form a first real composite signal;

second summation means connected to said third, fourth, and seventh delay means for real data for summing said fourth and sixth delayed real data and subtracting said third delayed real data to form a second real composite signal;

third summation means connected to said first weighting, fifth delay, and sixth delay means for imaginary data for summing said fifth and sixth delayed imaginary data and subtracting said $g_1$ weighted imaginary data to i form a first imaginary composite signal;

fourth summation means connected to said third, fourth, and sixth delay means for imaginary data for summing said forth and sixth delayed imaginary data and subtracting said third delayed imaginary data to form a second imaginary composite signal;

fifth summation means connected to said first and second summation means for real data, and second delay means for imaginary data for summing said second real composite signal and said second delayed imaginary samples, and subtracting said second real composite signal therefrom to form a third real composite signal;

sixth summation means connected to said first and second summation means for imaginary data, and second delay means for real data for summing said second imaginary composite signal and said second delayed real samples and subtracting said first imaginary composite signal therefrom to form a third imaginary composite signal;

seventh summation means connected to said first, second, and sixth summation means for summing said first composite real, second composite real and third composite imaginary signals to provide a real low half-band signal $Y_{RL}$;

eighth summation means connected to said third, fourth, and fifth summation means for summing said first composite imaginary, second composite imaginary, and third composite real signals to provide a low half-band signal $Y_{IL}$;

ninth summation means connected to said first, second, and sixth summation means for subtracting said first and second composite real signals from said third composite imaginary signal to provide a real high half-band signal $Y_{RH}$;

tenth summation means connected to said third, fourth, and fifth summation means for subtracting said first and second composite imaginary signals from said third composite real signal to provide an imaginary high half-band signal $Y_{IH}$; and first multiplier means connected to said ninth and tenth summation means for multiplying said $Y_{RH}$ and $Y_{IH}$ signals by a factor of $e^{-jk\pi/2}$.

* * * * *